United States Patent
Bone et al.

(10) Patent No.: US 10,139,592 B2
(45) Date of Patent: Nov. 27, 2018

(54) OCULAR OPTICAL SYSTEM

(71) Applicant: Genius Electronic Optical Co., Ltd., Taichung (TW)

(72) Inventors: Matthew Bone, Xiamen (CN); Guang-Yun Li, Xiamen (CN); Hui-Feng Pan, Xiamen (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 15/378,062

(22) Filed: Dec. 14, 2016

(65) Prior Publication Data

US 2018/0143401 A1    May 24, 2018

(30) Foreign Application Priority Data

Nov. 18, 2016 (CN) .......................... 2016 1 1028369

(51) Int. Cl.

| | |
|---|---|
| *G02B 13/18* | (2006.01) |
| *G02B 3/02* | (2006.01) |
| *G02B 9/12* | (2006.01) |
| *G02B 13/00* | (2006.01) |
| *G02B 5/00* | (2006.01) |
| *G02B 27/00* | (2006.01) |

(52) U.S. Cl.
CPC ......... *G02B 13/0035* (2013.01); *G02B 5/005* (2013.01); *G02B 9/12* (2013.01); *G02B 27/0025* (2013.01)

(58) Field of Classification Search
CPC ...... G02B 5/005; G02B 9/12; G02B 13/0035; G02B 13/04; G02B 27/0025

USPC ................... 359/716, 753, 784, 791
See application file for complete search history.

(56) References Cited

U.S. PATENT DOCUMENTS

2017/0248769 A1* 8/2017 Stamenov ................ G02B 9/12

FOREIGN PATENT DOCUMENTS

TW    I597522    9/2017

OTHER PUBLICATIONS

"Office Action of Taiwan Counterpart Application," dated Sep. 25, 2017, p. 1-p. 6, in which the listed reference was cited.

\* cited by examiner

*Primary Examiner* — William Choi
(74) *Attorney, Agent, or Firm* — JCIPRNET

(57) ABSTRACT

An ocular optical system includes a first lens element, a second lens element, and a third lens element from an eye-side to a display-side in order along an optical axis. The first lens element, the second lens element, and the third lens element each include an eye-side surface and a display-side surface. The first lens element has refracting power. The display-side surface of the second lens element has a convex portion in a vicinity of the optical axis. The third lens element has refracting power. The ocular optical system satisfies: T3/G23≤4.3; and G3D/T3≤3.51, where T3 is a thickness of the third lens element along the optical axis, G23 is an air gap from the second lens element to the third lens element along the optical axis, and G3D is a distance from the third lens element to the display screen along the optical axis.

20 Claims, 31 Drawing Sheets

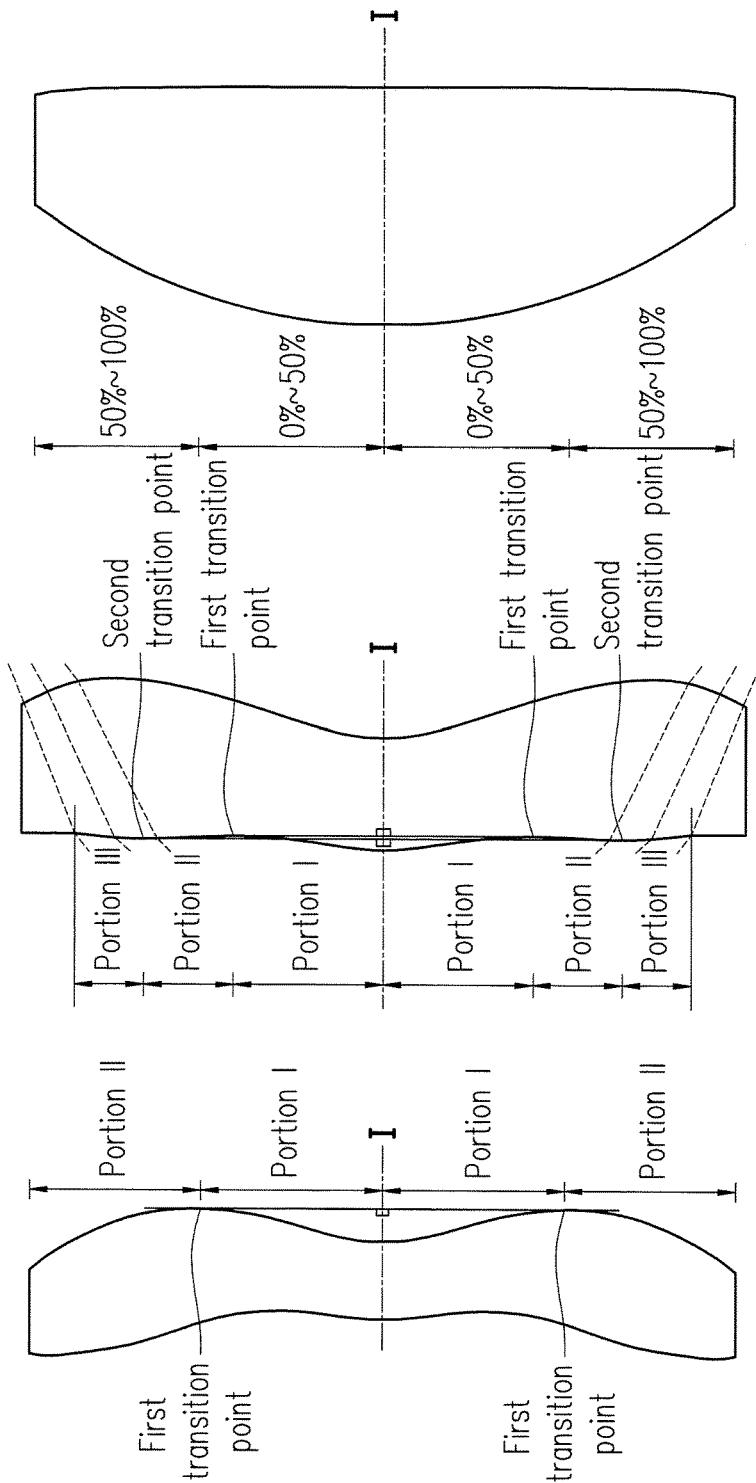

| First embodiment |||||||
|---|---|---|---|---|---|---|
| EFL=47.427 mm, ω=42.775°, TTL=66.543 mm, EPD=2.000 mm, 0.5DLD=35.000 mm, SL=77.236 mm |||||||
| Lens element | Surface | Radius of curvature(mm) | Thickness (mm) | Refractive index | Abbe number | Focal length(mm) | Effective radius (mm) |
| Pupil 2 |  | Infinity | 10.694 |  |  |  | 2.000 |
| First lens element 3 | Eye-side surface 31 | 71.925 | 26.736 | 1.492 | 57.441 | 46.926 | 12.801 |
|  | Display-side surface 32 | -29.816 | 0.026 |  |  |  | 20.816 |
| Second lens element 4 | Eye-side surface 41 | 30974561.962 | 8.738 | 1.492 | 57.441 | 119.770 | 23.051 |
|  | Display-side surface 42 | -58.900 | 18.326 |  |  |  | 23.390 |
| Third lens element 5 | Eye-side surface 51 | -29.019 | 3.000 | 1.661 | 20.401 | -36.681 | 23.191 |
|  | Display-side surface 52 | 153.047 | 9.717 |  |  |  | 31.281 |
|  | Display screen 100 | Infinity |  |  |  |  | 35.035 |

FIG. 9

| Surface | K | $a_2$ | $a_4$ | $a_6$ | $a_8$ |
|---|---|---|---|---|---|
| 31 | -1.122058E+01 | 0.000000E+00 | -4.109483E-06 | 6.700318E-09 | 2.412700E-11 |
| 32 | 0.000000E+00 | 0.000000E+00 | 7.568733E-06 | -3.602140E-09 | -1.019000E-12 |
| 41 | 0.000000E+00 | 0.000000E+00 | 1.986674E-06 | 2.681880E-10 | 3.050000E-13 |
| 42 | 0.000000E+00 | 0.000000E+00 | -7.486519E-06 | 3.911835E-09 | 4.460000E-13 |
| 51 | 0.000000E+00 | 0.000000E+00 | -4.383442E-05 | 4.910908E-08 | 3.664000E-12 |
| 52 | 0.000000E+00 | 0.000000E+00 | -1.777639E-05 | 8.924790E-09 | -2.800000E-13 |

| Surface | $a_{10}$ |
|---|---|
| 31 | -1.310000E-13 |
| 32 | 0.000000E+00 |
| 41 | -4.000000E-15 |
| 42 | 3.000000E-15 |
| 51 | 5.000000E-15 |
| 52 | 0.000000E+00 |

FIG. 10

| Second embodiment | | | | | | | |
|---|---|---|---|---|---|---|---|
| EFL=48.928 mm, ω=41.000°, TTL=61.725 mm, EPD=2.000 mm, 0.5DLD=35.000 mm, SL=79.881 mm ||||||||
| Lens element | Surface | Radius of curvature(mm) | Thickness (mm) | Refractive index | Abbe number | Focal length(mm) | Effective radius (mm) |
| Pupil 2 | | Infinity | 18.156 | | | | 2.000 |
| First lens element 3 | Eye-side surface 31 | 1170.528 | 6.141 | 1.492 | 57.441 | 151.091 | 18.396 |
| | Display-side surface 32 | -79.203 | 0.026 | | | | 19.725 |
| Second lens element 4 | Eye-side surface 41 | 519.053 | 12.272 | 1.492 | 57.441 | 47.253 | 20.736 |
| | Display-side surface 42 | -24.137 | 16.213 | | | | 21.376 |
| Third lens element 5 | Eye-side surface 51 | 1160.586 | 8.771 | 1.661 | 20.401 | -57.859 | 26.237 |
| | Display-side surface 52 | 36.896 | 18.303 | | | | 31.374 |
| | Display screen 100 | Infinity | | | | | 35.083 |

FIG. 13

| Surface | K | $a_2$ | $a_4$ | $a_6$ | $a_8$ |
|---|---|---|---|---|---|
| 31 | -4.309309E+06 | 0.000000E+00 | -7.965243E-06 | 3.439241E-08 | 7.278000E-11 |
| 32 | 0.000000E+00 | 0.000000E+00 | 1.240542E-05 | -1.131034E-08 | -2.687000E-11 |
| 41 | 0.000000E+00 | 0.000000E+00 | 3.056622E-06 | 1.557260E-09 | 1.687000E-11 |
| 42 | 0.000000E+00 | 0.000000E+00 | -1.258200E-05 | 4.944962E-08 | 3.070000E-12 |
| 51 | 0.000000E+00 | 0.000000E+00 | -4.746236E-05 | 7.326250E-08 | -2.068000E-11 |
| 52 | 0.000000E+00 | 0.000000E+00 | -2.642547E-05 | 1.521392E-08 | 5.420000E-12 |

| Surface | $a_{10}$ |
|---|---|
| 31 | -1.500000E-13 |
| 32 | 5.000000E-14 |
| 41 | -7.000000E-14 |
| 42 | 6.000000E-14 |
| 51 | -2.000000E-14 |
| 52 | -1.000000E-14 |

FIG. 14

| Third embodiment |||||||
|---|---|---|---|---|---|---|
| EFL=33.624 mm, ω=56.157°, TTL=50.411 mm, EPD=2.000 mm, 0.5DLD=35.000 mm, SL=58.411 mm |||||||
| Lens element | Surface | Radius of curvature(mm) | Thickness (mm) | Refractive index | Abbe number | Focal length(mm) | Effective radius (mm) |
| Pupil 2 | | Infinity | 8.000 | | | | 2.000 |
| First lens element 3 | Eye-side surface 31 | 5096.532 | 14.123 | 1.492 | 57.441 | 37.962 | 13.747 |
| | Display-side surface 32 | -18.721 | 2.077 | | | | 16.602 |
| Second lens element 4 | Eye-side surface 41 | 111.326 | 12.797 | 1.492 | 57.441 | 56.775 | 21.515 |
| | Display-side surface 42 | -35.855 | 7.176 | | | | 21.889 |
| Third lens element 5 | Eye-side surface 51 | -29.508 | 3.164 | 1.661 | 20.401 | -38.049 | 21.726 |
| | Display-side surface 52 | 176.997 | 11.074 | | | | 29.977 |
| | Display screen 100 | Infinity | | | | | 34.995 |

FIG. 17

| Surface | K | $a_2$ | $a_4$ | $a_6$ |
|---|---|---|---|---|
| 31 | -6.624239E+35 | 0.000000E+00 | -2.586992E-06 | -4.554710E-09 |
| 32 | 0.000000E+00 | 0.000000E+00 | -6.736241E-06 | 1.867681E-08 |
| 41 | 0.000000E+00 | 0.000000E+00 | -5.451907E-06 | 6.713980E-09 |
| 42 | 0.000000E+00 | 0.000000E+00 | -5.678641E-06 | -1.959470E-09 |
| 51 | 0.000000E+00 | 0.000000E+00 | -5.165799E-05 | 5.143390E-08 |
| 52 | 0.000000E+00 | 0.000000E+00 | -1.719215E-05 | 9.103850E-09 |

FIG. 18

| Fourth embodiment | | | | | | |
|---|---|---|---|---|---|---|
| EFL=61.299 mm, ω=40.975°, TTL=86.102 mm, EPD=2.000 mm, 0.5DLD=39.459 mm, SL=96.558 mm | | | | | | |
| Lens element | Surface | Radius of curvature(mm) | Thickness (mm) | Refractive index | Abbe number | Focal length(mm) | Effective radius (mm) |
| Pupil 2 | | Infinity | 10.456 | | | | 2.000 |
| First lens element 3 | Eye-side surface 31 | 57.167 | 25.412 | 1.492 | 57.441 | 48.190 | 12.016 |
| | Display-side surface 32 | -34.548 | 1.684 | | | | 19.265 |
| Second lens element 4 | Eye-side surface 41 | 98.190 | 8.967 | 1.492 | 57.441 | 132.637 | 21.296 |
| | Display-side surface 42 | -188.459 | 8.283 | | | | 21.765 |
| Third lens element 5 | Eye-side surface 51 | -29.450 | 35.599 | 1.661 | 20.401 | -38.773 | 21.726 |
| | Display-side surface 52 | 291.393 | 6.157 | | | | 37.414 |
| | Display screen 100 | Infinity | | | | | 39.609 |

FIG. 21

| Surface | K | $a_2$ | $a_4$ | $a_6$ |
|---|---|---|---|---|
| 31 | -2.946424E+00 | 0.000000E+00 | -5.345792E-06 | -1.615494E-08 |
| 32 | 0.000000E+00 | 0.000000E+00 | -3.067316E-06 | -9.646460E-09 |
| 41 | 0.000000E+00 | 0.000000E+00 | 1.151601E-06 | -1.463253E-08 |
| 42 | 0.000000E+00 | 0.000000E+00 | -1.754536E-05 | 5.028100E-10 |
| 51 | 0.000000E+00 | 0.000000E+00 | -3.855010E-05 | 4.779760E-08 |
| 52 | 0.000000E+00 | 0.000000E+00 | -6.324178E-06 | 9.482600E-10 |

FIG. 22

| Fifth embodiment |||||||
|---|---|---|---|---|---|---|
| EFL=43.758 mm, ω=40.996°, TTL=62.359 mm, EPD=2.000 mm, 0.5DLD=36.608 mm, SL=71.570 mm |||||||
| Lens element | Surface | Radius of curvature(mm) | Thickness (mm) | Refractive index | Abbe number | Focal length(mm) | Effective radius (mm) |
| Pupil 2 | | Infinity | 9.210 | | | | 2.000 |
| First lens element 3 | Eye-side surface 31 | 1393.708 | 13.174 | 1.492 | 57.441 | 51.975 | 9.985 |
| | Display-side surface 32 | -25.957 | 15.851 | | | | 14.328 |
| Second lens element 4 | Eye-side surface 41 | 100.481 | 7.862 | 1.492 | 57.441 | 121.123 | 22.858 |
| | Display-side surface 42 | -142.510 | 20.053 | | | | 23.150 |
| Third lens element 5 | Eye-side surface 51 | -32.538 | 3.406 | 1.661 | 20.401 | -40.282 | 23.272 |
| | Display-side surface 52 | 152.244 | 2.013 | | | | 35.156 |
| | Display screen 100 | Infinity | | | | | 36.917 |

FIG. 25

| Surface | K | $a_2$ | $a_4$ | $a_6$ |
|---|---|---|---|---|
| 31 | -2.255502E+39 | 0.000000E+00 | 1.047121E-05 | -1.283590E-07 |
| 32 | 0.000000E+00 | 0.000000E+00 | 7.182770E-06 | -7.626842E-08 |
| 41 | 0.000000E+00 | 0.000000E+00 | 6.634057E-07 | -6.100800E-10 |
| 42 | 0.000000E+00 | 0.000000E+00 | -4.746869E-06 | 7.983500E-10 |
| 51 | 0.000000E+00 | 0.000000E+00 | -7.359437E-05 | 7.072016E-08 |
| 52 | 0.000000E+00 | 0.000000E+00 | 7.061664E-07 | -4.377690E-09 |

FIG. 26

| Sixth embodiment | | | | | | |
|---|---|---|---|---|---|---|
| EFL=45.853 mm, ω=40.551°, TTL=57.724 mm, EPD=2.000 mm, 0.5DLD=31.956 mm, SL=79.996 mm | | | | | | |
| Lens element | Surface | Radius of curvature(mm) | Thickness (mm) | Refractive index | Abbe number | Focal length(mm) | Effective radius (mm) |
| Pupil 2 | | Infinity | 22.272 | | | | 2.000 |
| First lens element 3 | Eye-side surface 31 | 87.250 | 15.558 | 1.492 | 57.441 | 44.922 | 22.719 |
| | Display-side surface 32 | -27.843 | 0.006 | | | | 23.984 |
| Second lens element 4 | Eye-side surface 41 | 101.878 | 13.802 | 1.492 | 57.441 | 119.962 | 27.123 |
| | Display-side surface 42 | -133.896 | 14.631 | | | | 26.844 |
| Third lens element 5 | Eye-side surface 51 | -29.186 | 5.180 | 1.661 | 20.401 | -31.794 | 25.425 |
| | Display-side surface 52 | 80.234 | 8.548 | | | | 30.571 |
| | Display screen 100 | Infinity | | | | | 32.180 |

FIG. 29

| Surface | K | $a_2$ | $a_4$ | $a_6$ |
|---|---|---|---|---|
| 31 | -2.162081E+00 | 0.000000E+00 | -2.223727E-06 | -2.660610E-09 |
| 32 | 0.000000E+00 | 0.000000E+00 | 7.654164E-06 | 1.642010E-09 |
| 41 | 0.000000E+00 | 0.000000E+00 | 2.567262E-06 | 3.460090E-09 |
| 42 | 0.000000E+00 | 0.000000E+00 | -8.203520E-06 | 4.299820E-09 |
| 51 | 0.000000E+00 | 0.000000E+00 | -3.718804E-05 | 4.760546E-08 |
| 52 | 0.000000E+00 | 0.000000E+00 | -1.063904E-05 | 2.907540E-09 |

FIG. 30

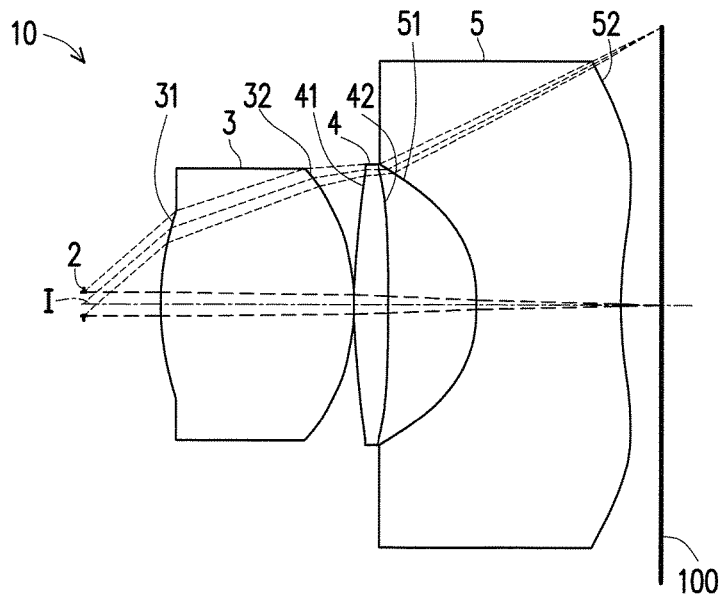
FIG. 31
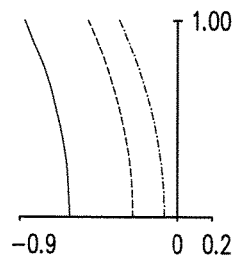 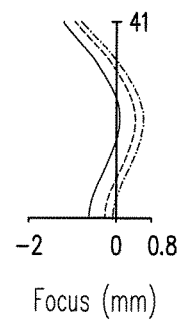 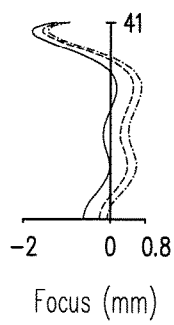 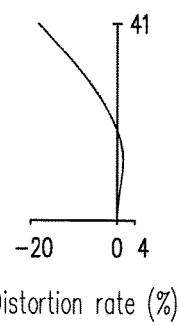
FIG. 32A  FIG. 32B  FIG. 32C  FIG. 32D

| Seventh embodiment |||||||
|---|---|---|---|---|---|---|
| EFL=61.919 mm, ω=41.000°, TTL=80.258 mm, EPD=2.000 mm, 0.5DLD=44.369 mm, SL=92.925 mm |||||||
| Lens element | Surface | Radius of curvature(mm) | Thickness (mm) | Refractive index | Abbe number | Focal length(mm) | Effective radius (mm) |
| Pupil 2 | | Infinity | 12.668 | | | | 2.000 |
| First lens element 3 | Eye-side surface 31 | 47.682 | 30.899 | 1.492 | 57.441 | 47.232 | 15.073 |
| | Display-side surface 32 | -35.615 | 0.026 | | | | 21.814 |
| Second lens element 4 | Eye-side surface 41 | 107.611 | 5.411 | 1.492 | 57.441 | 214.866 | 22.552 |
| | Display-side surface 42 | -5753.119 | 14.329 | | | | 22.637 |
| Third lens element 5 | Eye-side surface 51 | -29.761 | 23.208 | 1.661 | 20.401 | -27.036 | 22.618 |
| | Display-side surface 52 | 58.537 | 6.386 | | | | 39.156 |
| | Display screen 100 | Infinity | | | | | 44.593 |

FIG. 33

| Surface | K | $a_2$ | $a_4$ | $a_6$ |
|---|---|---|---|---|
| 31 | 2.292125E+00 | 0.000000E+00 | -8.804787E-07 | -1.728607E-08 |
| 32 | 0.000000E+00 | 0.000000E+00 | 1.531772E-06 | -7.144960E-09 |
| 41 | 0.000000E+00 | 0.000000E+00 | 1.017548E-06 | -6.707380E-09 |
| 42 | 0.000000E+00 | 0.000000E+00 | -8.696099E-06 | 5.111990E-09 |
| 51 | 0.000000E+00 | 0.000000E+00 | -4.127925E-05 | 4.219027E-08 |
| 52 | 0.000000E+00 | 0.000000E+00 | -1.371109E-05 | 3.449450E-09 |

FIG. 34

| Eighth embodiment | | | | | | |
|---|---|---|---|---|---|---|
| EFL=45.381 mm, ω=40.977°, TTL=75.038 mm, EPD=2.000 mm, 0.5DLD=35.240 mm, SL=85.651 mm | | | | | | |
| Lens element | Surface | Radius of curvature(mm) | Thickness (mm) | Refractive index | Abbe number | Focal length(mm) | Effective radius (mm) |
| Pupil 2 | | Infinity | 10.613 | | | | 2.000 |
| First lens element 3 | Eye-side surface 31 | 79.829 | 34.049 | 1.492 | 57.441 | 48.211 | 11.748 |
| | Display-side surface 32 | -28.984 | 0.024 | | | | 22.710 |
| Second lens element 4 | Eye-side surface 41 | 97.757 | 14.380 | 1.492 | 57.441 | 130.923 | 26.034 |
| | Display-side surface 42 | -179.462 | 15.511 | | | | 25.839 |
| Third lens element 5 | Eye-side surface 51 | -34.667 | 3.405 | 1.661 | 20.401 | -40.274 | 23.996 |
| | Display-side surface 52 | 118.932 | 7.670 | | | | 29.937 |
| Display screen 100 | | Infinity | | | | | 35.215 |

FIG. 37

| Surface | K | $a_2$ | $a_4$ | $a_6$ |
|---|---|---|---|---|
| 31 | -4.262238E+01 | 0.000000E+00 | -4.466686E-06 | -1.198630E-08 |
| 32 | 0.000000E+00 | 0.000000E+00 | 7.924358E-06 | -4.183260E-09 |
| 41 | 0.000000E+00 | 0.000000E+00 | 1.469198E-06 | 2.706370E-09 |
| 42 | 0.000000E+00 | 0.000000E+00 | -7.758476E-06 | 2.559700E-10 |
| 51 | 0.000000E+00 | 0.000000E+00 | -5.112807E-05 | 4.852421E-08 |
| 52 | 0.000000E+00 | 0.000000E+00 | -1.779495E-05 | 1.007677E-08 |

FIG. 38

| Ninth embodiment | | | | | | | |
|---|---|---|---|---|---|---|---|
| EFL=50.614 mm, ω=41.000°, TTL=67.726 mm, EPD=2.000 mm, 0.5DLD=35.000 mm, SL=79.994 mm | | | | | | | |
| Lens element | Surface | Radius of curvature(mm) | Thickness (mm) | Refractive index | Abbe number | Focal length(mm) | Effective radius (mm) |
| Pupil 2 | | Infinity | 12.268 | | | | 2.000 |
| First lens element 3 | Eye-side surface 31 | 88.505 | 23.149 | 1.492 | 57.441 | 40.431 | 13.057 |
| | Display-side surface 32 | -23.433 | 0.057 | | | | 18.851 |
| Second lens element 4 | Eye-side surface 41 | 147.191 | 11.861 | 1.492 | 57.441 | 170.466 | 19.760 |
| | Display-side surface 42 | -189.578 | 8.354 | | | | 22.226 |
| Third lens element 5 | Eye-side surface 51 | -31.950 | 5.401 | 1.661 | 20.401 | -44.538 | 22.256 |
| | Display-side surface 52 | 397.375 | 18.904 | | | | 27.086 |
| | Display screen 100 | Infinity | | | | | 35.015 |

FIG. 41

| Surface | K | $a_2$ | $a_4$ | $a_6$ |
|---|---|---|---|---|
| 31 | -6.697152E+01 | 0.000000E+00 | -2.950750E-06 | -4.339689E-08 |
| 32 | 0.000000E+00 | 0.000000E+00 | -1.262315E-05 | -3.673590E-09 |
| 41 | 0.000000E+00 | 0.000000E+00 | -1.101416E-05 | -2.149004E-08 |
| 42 | 0.000000E+00 | 0.000000E+00 | -7.170073E-06 | -4.387800E-09 |
| 51 | 0.000000E+00 | 0.000000E+00 | -3.712622E-05 | 5.344654E-08 |
| 52 | 0.000000E+00 | 0.000000E+00 | -1.546546E-05 | 8.523460E-09 |

FIG. 42

| Tenth embodiment | | | | | | | |
|---|---|---|---|---|---|---|---|
| EFL=52.153 mm, ω=41.000°, TTL=65.173 mm, EPD=2.000 mm, 0.5DLD=38.492 mm, SL=74.857 mm | | | | | | | |
| Lens element | Surface | Radius of curvature(mm) | Thickness (mm) | Refractive index | Abbe number | Focal length(mm) | Effective radius (mm) |
| Pupil 2 | | Infinity | 9.684 | | | | 2.000 |
| First lens element 3 | Eye-side surface 31 | 41.423 | 20.674 | 1.492 | 57.441 | 50.180 | 12.100 |
| | Display-side surface 32 | -51.001 | 0.029 | | | | 16.934 |
| Second lens element 4 | Eye-side surface 41 | 208.556 | 8.142 | 1.492 | 57.441 | 165.935 | 17.747 |
| | Display-side surface 42 | -132.333 | 21.503 | | | | 19.185 |
| Third lens element 5 | Eye-side surface 51 | -23.680 | 12.674 | 1.661 | 20.401 | -30.700 | 21.001 |
| | Display-side surface 52 | 171.486 | 2.151 | | | | 32.768 |
| | Display screen 100 | Infinity | | | | | 38.556 |

FIG. 45

| Surface | K | $a_2$ | $a_4$ | $a_6$ | $a_8$ |
|---|---|---|---|---|---|
| 31 | -7.185110E+00 | 0.000000E+00 | 1.000277E-05 | 8.185484E-08 | -3.179500E-10 |
| 32 | 0.000000E+00 | 0.000000E+00 | 7.042689E-06 | 3.360200E-10 | 4.769000E-11 |
| 41 | 0.000000E+00 | 0.000000E+00 | -9.665084E-06 | 7.990320E-09 | 2.886000E-11 |
| 42 | 0.000000E+00 | 0.000000E+00 | -2.586152E-05 | 2.416402E-08 | -9.540000E-12 |
| 51 | 0.000000E+00 | 0.000000E+00 | -7.285822E-05 | 1.023599E-07 | -1.892000E-11 |
| 52 | 0.000000E+00 | 0.000000E+00 | -1.789259E-05 | 5.642570E-09 | -4.400000E-13 |
| Surface | $a_{10}$ | | | | |
| 31 | 4.300000E-13 | | | | |
| 32 | 3.000000E-14 | | | | |
| 41 | -1.300000E-13 | | | | |
| 42 | -1.000000E-14 | | | | |
| 51 | 1.200000E-13 | | | | |
| 52 | 0.000000E+00 | | | | |

FIG. 46

| Eleventh embodiment ||||||||
| --- | --- | --- | --- | --- | --- | --- | --- |
| EFL=49.186 mm, ω=41.000°, TTL=61.444 mm, EPD=2.000 mm, 0.5DLD=35.000 mm, SL=80.000 mm ||||||||
| Lens element | Surface | Radius of curvature(mm) | Thickness (mm) | Refractive index | Abbe number | Focal length(mm) | Effective radius (mm) |
| Pupil 2 | | Infinity | 18.556 | | | | 2.000 |
| First lens element 3 | Eye-side surface 31 | 46.306 | 19.467 | 1.492 | 57.441 | 44.166 | 22.532 |
| | Display-side surface 32 | -35.239 | 7.003 | | | | 24.038 |
| Second lens element 4 | Eye-side surface 41 | 206.568 | 10.156 | 1.492 | 57.441 | 92.340 | 23.886 |
| | Display-side surface 42 | -57.263 | 7.614 | | | | 24.102 |
| Third lens element 5 | Eye-side surface 51 | -30.339 | 4.751 | 1.661 | 20.401 | -34.649 | 23.924 |
| | Display-side surface 52 | 99.070 | 12.453 | | | | 29.167 |
| | Display screen 100 | Infinity | | | | | 35.020 |

FIG. 49

| Surface | K | $a_2$ | $a_4$ | $a_6$ | $a_8$ |
|---|---|---|---|---|---|
| 31 | -7.185110E+00 | 0.000000E+00 | 1.000277E-05 | 8.185484E-08 | -3.179500E-10 |
| 32 | 0.000000E+00 | 0.000000E+00 | 7.042689E-06 | 3.360200E-10 | 4.769000E-11 |
| 41 | 0.000000E+00 | 0.000000E+00 | -9.665084E-06 | 7.990320E-09 | 2.886000E-11 |
| 42 | 0.000000E+00 | 0.000000E+00 | -2.586152E-05 | 2.416402E-08 | -9.540000E-12 |
| 51 | 0.000000E+00 | 0.000000E+00 | -7.285822E-05 | 1.023599E-07 | -1.892000E-11 |
| 52 | 0.000000E+00 | 0.000000E+00 | -1.789259E-05 | 5.642570E-09 | -4.400000E-13 |
| Surface | $a_{10}$ | | | | |
| 31 | 4.300000E-13 | | | | |
| 32 | 3.000000E-14 | | | | |
| 41 | -1.300000E-13 | | | | |
| 42 | -1.000000E-14 | | | | |
| 51 | 1.200000E-13 | | | | |
| 52 | 0.000000E+00 | | | | |

FIG. 50

| Condition | First embodiment | Second embodiment | Third embodiment | Fourth embodiment | Fifth embodiment |
|---|---|---|---|---|---|
| ER | 10.69 | 18.16 | 8.00 | 10.46 | 9.21 |
| T1 | 26.74 | 6.14 | 14.12 | 25.41 | 13.17 |
| G12 | 0.026 | 0.026 | 2.077 | 1.684 | 15.85 |
| T2 | 8.74 | 12.27 | 12.80 | 8.97 | 7.86 |
| G23 | 18.33 | 16.21 | 7.18 | 8.28 | 20.05 |
| T3 | 3.00 | 8.77 | 3.16 | 35.60 | 3.41 |
| G3D | 9.72 | 18.30 | 11.07 | 6.16 | 2.01 |
| ALT | 38.47 | 27.18 | 30.08 | 69.98 | 24.44 |
| AAG | 18.35 | 16.24 | 9.25 | 9.97 | 35.90 |
| TTL | 66.54 | 61.73 | 50.41 | 86.10 | 62.36 |
| SL | 77.24 | 79.88 | 58.41 | 96.56 | 71.57 |
| T3/G23 | 0.16 | 0.54 | 0.44 | 4.30 | 0.17 |
| G3D/T3 | 3.24 | 2.09 | 3.50 | 0.17 | 0.59 |
| ER/T1 | 0.40 | 2.96 | 0.57 | 0.41 | 0.70 |
| G23/G3D | 1.89 | 0.89 | 0.65 | 1.35 | 9.96 |
| EFL/ALT | 1.23 | 1.80 | 1.12 | 0.88 | 1.79 |
| AAG/T2 | 2.10 | 1.32 | 0.72 | 1.11 | 4.57 |
| 250 mm/EFL | 5.27 | 5.11 | 7.44 | 4.08 | 5.71 |
| ALT/ER | 3.60 | 1.50 | 3.76 | 6.69 | 2.65 |
| ER/T3 | 3.56 | 2.07 | 2.53 | 0.29 | 2.70 |
| T1/T2 | 3.06 | 0.50 | 1.10 | 2.83 | 1.68 |
| EFL/AAG | 2.58 | 3.01 | 3.63 | 6.15 | 1.22 |
| SL/ER | 7.22 | 4.40 | 7.30 | 9.23 | 7.77 |
| (ER+G12+G3D)/T3 | 6.81 | 4.16 | 6.68 | 0.51 | 7.95 |
| ALT/T2 | 4.40 | 2.22 | 2.35 | 7.80 | 3.11 |
| ER/G23 | 0.58 | 1.12 | 1.11 | 1.26 | 0.46 |
| T1/T3 | 8.91 | 0.70 | 4.46 | 0.71 | 3.87 |
| TTL/EFL | 1.40 | 1.26 | 1.50 | 1.40 | 1.43 |
| AAG/G3D | 1.89 | 0.89 | 0.84 | 1.62 | 17.83 |
| (ER+G12+G3D)/G23 | 1.12 | 2.25 | 2.95 | 2.21 | 1.35 |

FIG. 51

| Condition | Sixth embodiment | Seventh embodiment | Eighth embodiment | Ninth embodiment | Tenth embodiment | Eleventh embodiment |
|---|---|---|---|---|---|---|
| ER | 22.27 | 12.67 | 10.61 | 12.27 | 9.68 | 18.56 |
| T1 | 15.56 | 30.90 | 34.05 | 23.15 | 20.67 | 19.47 |
| G12 | 0.006 | 0.026 | 0.024 | 0.06 | 0.03 | 7.00 |
| T2 | 13.80 | 5.41 | 14.38 | 11.86 | 8.14 | 10.16 |
| G23 | 14.63 | 14.33 | 15.51 | 8.35 | 21.50 | 7.61 |
| T3 | 5.18 | 23.21 | 3.40 | 5.40 | 12.67 | 4.75 |
| G3D | 8.55 | 6.39 | 7.67 | 18.90 | 2.15 | 12.45 |
| ALT | 34.54 | 59.52 | 51.83 | 40.41 | 41.49 | 34.37 |
| AAG | 14.64 | 14.35 | 15.54 | 8.41 | 21.53 | 14.62 |
| TTL | 57.72 | 80.26 | 75.04 | 67.73 | 65.17 | 61.44 |
| SL | 80.00 | 92.93 | 85.65 | 79.99 | 74.86 | 80.00 |
| T3/G23 | 0.35 | 1.62 | 0.22 | 0.65 | 0.59 | 0.62 |
| G3D/T3 | 1.65 | 0.28 | 2.25 | 3.50 | 0.17 | 2.62 |
| ER/T1 | 1.43 | 0.41 | 0.31 | 0.53 | 0.47 | 0.95 |
| G23/G3D | 1.71 | 2.24 | 2.02 | 0.44 | 10.00 | 0.61 |
| EFL/ALT | 1.33 | 1.04 | 0.88 | 1.25 | 1.26 | 1.43 |
| AAG/T2 | 1.06 | 2.65 | 1.08 | 0.71 | 2.64 | 1.44 |
| 250 mm/EFL | 5.45 | 4.04 | 5.51 | 4.94 | 4.79 | 5.08 |
| ALT/ER | 1.55 | 4.70 | 4.88 | 3.29 | 4.28 | 1.85 |
| ER/T3 | 4.30 | 0.55 | 3.12 | 2.27 | 0.76 | 3.91 |
| T1/T2 | 1.13 | 5.71 | 2.37 | 1.95 | 2.54 | 1.92 |
| EFL/AAG | 3.13 | 4.31 | 2.92 | 6.02 | 2.42 | 3.37 |
| SL/ER | 3.59 | 7.34 | 8.07 | 6.52 | 7.73 | 4.31 |
| (ER+G12+G3D)/T3 | 5.95 | 0.82 | 5.38 | 5.78 | 0.94 | 8.00 |
| ALT/T2 | 2.50 | 11.00 | 3.60 | 3.41 | 5.10 | 3.38 |
| ER/G23 | 1.52 | 0.88 | 0.68 | 1.47 | 0.45 | 2.44 |
| T1/T3 | 3.00 | 1.33 | 10.00 | 4.29 | 1.63 | 4.10 |
| TTL/EFL | 1.26 | 1.30 | 1.65 | 1.34 | 1.25 | 1.25 |
| AAG/G3D | 1.71 | 2.25 | 2.03 | 0.44 | 10.01 | 1.17 |
| (ER+G12+G3D)/G23 | 2.11 | 1.33 | 1.18 | 3.74 | 0.55 | 4.99 |

FIG. 52

OCULAR OPTICAL SYSTEM

CROSS-REFERENCE TO RELATED APPLICATION

This application claims the priority benefit of China application serial no. 201611028369.9, filed on Nov. 18, 2016. The entirety of the above-mentioned patent application is hereby incorporated by reference herein and made a part of this specification.

BACKGROUND OF THE INVENTION

1. Field of the Invention

The invention relates to an optical system, and particularly, to an ocular optical system.

2. Description of Related Art

Virtual Reality (VR) refers to computer technologies used for simulating and generating a three-dimensional virtual world, which enables immersive simulation for users by providing simulations pertaining to visual sensation, auditory sensation and other sensations to users. The currently existing VR devices are mainly focused on visual experiences. Binocular parallax of human eyes is simulated by separated images with two slightly different perspectives corresponding to the left and right eyes to achieve a stereo vision. In order to reduce the volume of the VR device so users can receive a magnified visual sensation from a smaller display screen, an ocular optical system with magnifying capability is now one of major topics in research and development for VR.

Because a half apparent field of view is smaller in the existing ocular optical system, an observer may experience narrow vision, low resolution and even aberrations so serious that an aberration compensation must be performed on the display screen before presentation. Accordingly, how to increase the half apparent field of view and enhance the imaging quality becomes one of issues to be addressed.

SUMMARY OF THE INVENTION

The invention is directed to an ocular optical system, which is capable of shortening a system length without sacrificing a favorable imaging quality and a large half apparent field of view.

An embodiment of the invention proposes an ocular optical system for imaging of imaging rays entering an eye of an observer via the ocular optical system from a display screen. A side facing towards the eye is an eye-side, and a side facing towards the display screen is a display-side. The ocular optical system includes a first lens element, a second lens element, and a third lens element from the eye-side to the display-side in order along an optical axis. The first lens element, the second lens element, and the third lens element each include an eye-side surface and a display-side surface. The first lens element has refracting power. The display-side surface of the second lens element has a convex portion in a vicinity of the optical axis. The third lens element has refracting power. The ocular optical system satisfies: T3/G23≤4.3; and G3D/T3≤3.51, where T3 is a thickness of the third lens element along the optical axis, G23 is an air gap from the second lens element to the third lens element along the optical axis, and G3D is a distance from the third lens element to the display screen along the optical axis.

An embodiment of the invention proposes an ocular optical system for imaging of imaging rays entering an eye of an observer via the ocular optical system from a display screen. A side facing towards the eye is an eye-side, and a side facing towards the display screen is a display-side. The ocular optical system includes a first lens element, a second lens element, and a third lens element from the eye-side to the display-side in order along an optical axis. The first lens element, the second lens element, and the third lens element each include an eye-side surface and a display-side surface. The first lens element has refracting power. The display-side surface of the second lens element has a convex portion in a vicinity of a periphery of the second lens element. The third lens element has refracting power. The ocular optical system satisfies: T3/G23≤4.3; and G3D/T3≤3.51, where T3 is a thickness of the third lens element along the optical axis, G23 is an air gap from the second lens element to the third lens element along the optical axis, and G3D is a distance from the third lens element to the display screen along the optical axis.

An embodiment of the invention proposes an ocular optical system for imaging of imaging rays entering an eye of an observer via the ocular optical system from a display screen. A side facing towards the eye is an eye-side, and a side facing towards the display screen is a display-side. The ocular optical system includes a first lens element, a second lens element, and a third lens element from the eye-side to the display-side in order along an optical axis. The first lens element, the second lens element, and the third lens element each include an eye-side surface and a display-side surface. The first lens element has refracting power. The eye-side surface of the second lens element has a convex portion in a vicinity of the optical axis. The eye-side surface of the third lens element has a concave portion in a vicinity of a periphery of the third lens element. The ocular optical system satisfies: T3/G23≤4.3; and G3D/T3≤3.51, where T3 is a thickness of the third lens element along the optical axis, G23 is an air gap from the second lens element to the third lens element along the optical axis, and G3D is a distance from the third lens element to the display screen along the optical axis.

Based on the above, in the embodiments of the invention, the ocular optical system can provide the following advantageous effects. With design and arrangement of the lens elements in terms of surface shapes and refracting powers as well as design of optical parameters, the ocular optical system can include optical properties for overcoming the aberrations and provide the favorable imaging quality and the large apparent field of view, given that the system length is shorten.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a schematic view illustrating a surface structure of a lens element according to a first example.

FIG. 5 is a schematic view illustrating a surface structure of a lens element according to a second example.

FIG. 6 is a schematic view illustrating a surface structure of a lens element according to a third example.

FIG. 9 shows detailed optical data pertaining to the ocular optical system according to the first embodiment of the invention.

FIG. 10 shows aspheric parameters pertaining to the ocular optical system according to the first embodiment of the invention.

FIG. 13 shows detailed optical data pertaining to the ocular optical system according to the second embodiment of the invention.

FIG. 14 shows aspheric parameters pertaining to the ocular optical system according to the second embodiment of the invention.

FIG. 17 shows detailed optical data pertaining to the ocular optical system according to the third embodiment of the invention.

FIG. 18 shows aspheric parameters pertaining to the ocular optical system according to the third embodiment of the invention.

FIG. 21 shows detailed optical data pertaining to the ocular optical system according to the fourth embodiment of the invention.

FIG. 22 shows aspheric parameters pertaining to the ocular optical system according to the fourth embodiment of the invention.

FIG. 25 shows detailed optical data pertaining to the ocular optical system according to the fifth embodiment of the invention.

FIG. 26 shows aspheric parameters pertaining to the ocular optical system according to the fifth embodiment of the invention.

FIG. 29 shows detailed optical data pertaining to the ocular optical system according to the sixth embodiment of the invention.

FIG. 30 shows aspheric parameters pertaining to the ocular optical system according to the sixth embodiment of the invention.

FIG. 31 is a schematic view illustrating an ocular optical system according to a seventh embodiment of the invention.

FIG. 32A to FIG. 32D illustrate a longitudinal spherical aberration and other aberrations of the ocular optical system according to the seventh embodiment of the invention.

FIG. 33 shows detailed optical data pertaining to the ocular optical system according to the seventh embodiment of the invention.

FIG. 34 shows aspheric parameters pertaining to the ocular optical system according to the seventh embodiment of the invention.

FIG. 37 shows detailed optical data pertaining to the ocular optical system according to the eighth embodiment of the invention.

FIG. 38 shows aspheric parameters pertaining to the ocular optical system according to the eighth embodiment of the invention.

FIG. 41 shows detailed optical data pertaining to the ocular optical system according to the ninth embodiment of the invention.

FIG. 42 shows aspheric parameters pertaining to the ocular optical system according to the ninth embodiment of the invention.

FIG. 45 shows detailed optical data pertaining to the ocular optical system according to the tenth embodiment of the invention.

FIG. 46 shows aspheric parameters pertaining to the ocular optical system according to the tenth embodiment of the invention.

FIG. 49 shows detailed optical data pertaining to the ocular optical system according to the eleventh embodiment of the invention.

FIG. 50 shows aspheric parameters pertaining to the ocular optical system according to the eleventh embodiment of the invention.

FIG. 51 and FIG. 52 show important parameters and relation values thereof pertaining to the ocular optical system according to the first through the ninth embodiments of the invention.

DESCRIPTION OF THE EMBODIMENTS

Figure 1:
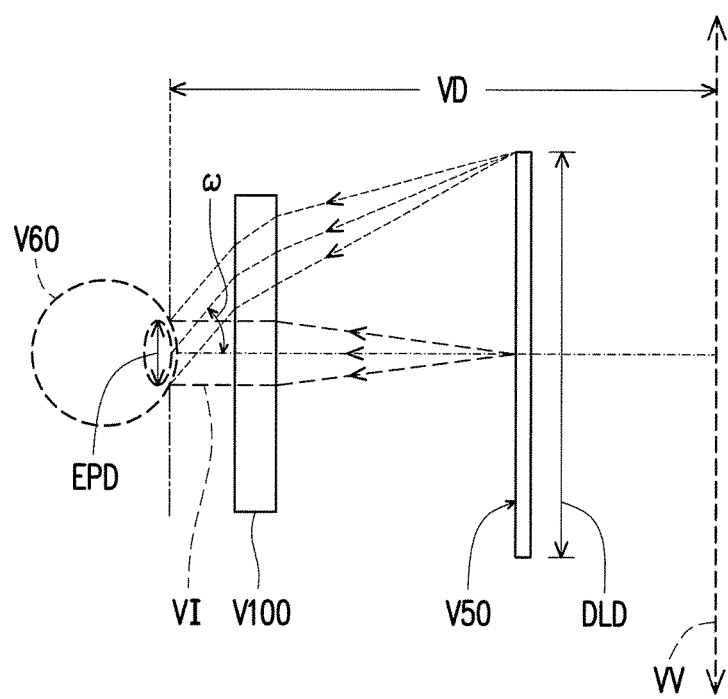
FIG. 1 is a schematic view illustrating an ocular optical system.

Reference will now be made in detail to the present preferred embodiments of the invention, examples of which are illustrated in the accompanying drawings. Wherever possible, the same reference numbers are used in the drawings and the description to refer to the same or like parts.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a least distance of distinct vision VD, as depicted in FIG. 1. The following criteria for determining optical specifications of the present application are based on assumption that a reversely tracking of the ray direction is parallel imaging rays passing through the ocular optical system from an eye-side and focused on the display screen for imaging.

In the present specification, the description "a lens element having positive refracting power (or negative refracting power)" means that the paraxial refracting power of the lens element in Gaussian optics is positive (or negative). The description "An eye-side (or display-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 2:
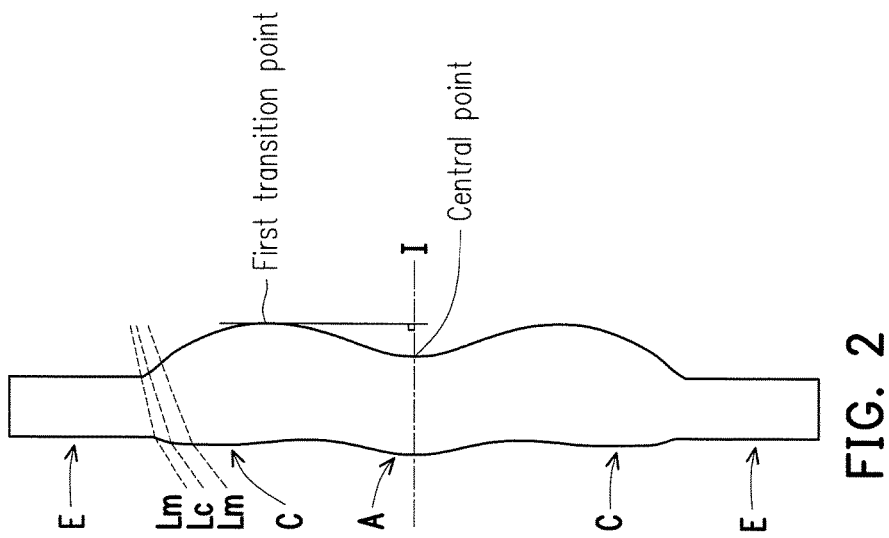
FIG. 2 is a schematic view illustrating a surface structure of a lens element.

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 3:
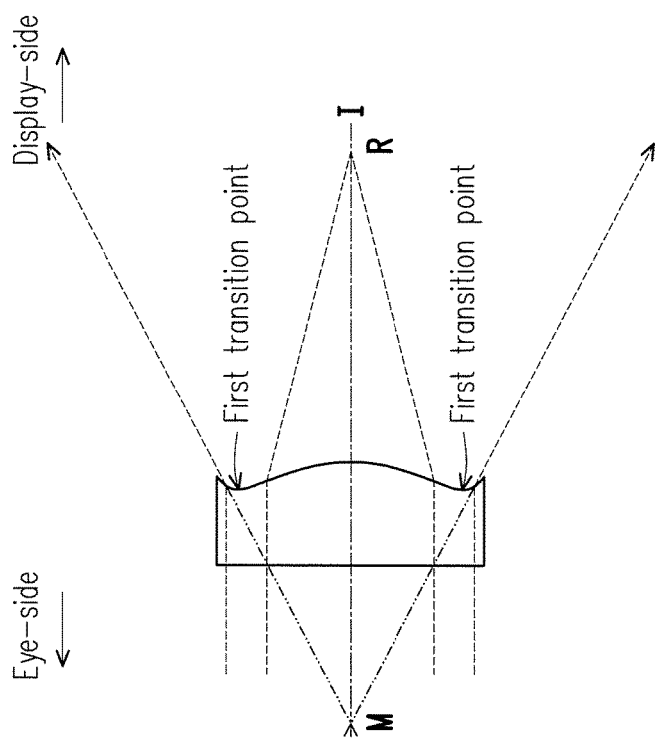
FIG. 3 is a schematic view illustrating a concave and convex surface structure of a lens element and a ray focal point.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, i.e. the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, i.e. the focal point of the ray is at the eye-side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the eye-side or the display-side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is determined as having a concave surface due to the R value at the display-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the eye-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the eye-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

Figure 7:
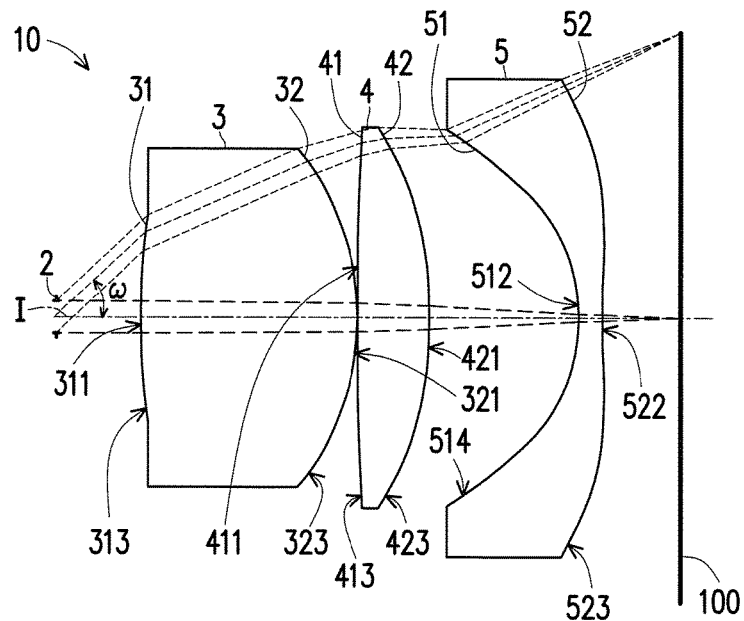
FIG. 7 is a schematic view illustrating an ocular optical system according to a first embodiment of the invention.

FIG. 7 is a schematic view illustrating an ocular optical system according to the first embodiment of the invention, and FIG. 8A to FIG. 8D illustrate a longitudinal spherical aberration and other aberrations of the ocular optical system according to the first embodiment of the invention. Referring to FIG. 7, an ocular optical system 10 according to the first embodiment of the invention is used for imaging of imaging rays entering an eye of an observer via the ocular optical system 10 and a pupil 2 of the eye of the observer from a display screen 100. A side facing towards the eye is an eye-side, a side facing towards the display screen 100 is a display-side. The ocular optical system 10 includes a first lens element 3, a second lens element 4, and a third lens element 5 from the eye-side to the display-side in order along an optical axis I of the ocular optical system 10. When the rays emitted by the display screen 100 enter the ocular optical system 10, pass through third lens element 5, the second lens elements 4, and the first lens element 3 in order, and enter the eye of the observer via the pupil 2, an image is formed on a retina of the eye.

The first lens element 3, the second lens element 4, and the third lens element 5 each include an eye-side surface 31, 41, 51 facing the eye-side and allowing the imaging rays to pass through and a display-side surface 32, 42, 52 facing the display-side and allowing the imaging rays to pass through. In order to meet the demand for lighter products, the first lens element 3, the second lens element 4, and the third lens element 5 all have refracting power. Besides, the first lens element 3, the second lens element 4, and the third lens element 5 are made of plastic material; nevertheless, the material of the first lens element 3, the second lens element 4, and the third lens element 5 is not limited thereto.

The first lens element 3 has positive refracting power. The eye-side surface 31 of the first lens element 3 is a convex surface, and has a convex portion 311 in a vicinity of the optical axis I and a convex portion 313 in a vicinity of a periphery of the first lens element 3. The display-side surface 32 of the first lens element 3 is a convex surface, and has a convex portion 321 in a vicinity of the optical axis I and a convex portion 323 in a vicinity of a periphery of the first lens element 3.

The second lens element 4 has positive refracting power. The eye-side surface 41 of the second lens element 4 is a convex surface, and has a convex portion 411 in a vicinity of the optical axis I and a convex portion 413 in a vicinity of a periphery of the second lens element 4. The display-side surface 42 of the second lens element 4 is a convex surface, and has a convex portion 421 in a vicinity of the optical axis I and a convex portion 423 in a vicinity of a periphery of the second lens element 4.

The third lens element 5 has negative refracting power. The eye-side surface 51 of the third lens element 5 is a concave surface, and has a concave portion 512 in a vicinity of the optical axis I and a concave portion 514 in a vicinity of a periphery of the third lens element 5. The display-side surface 52 of the third lens element 5 has a concave portion 522 in a vicinity of the optical axis I and a convex portion 523 in a vicinity of a periphery of the third lens element 5.

Further, in the present embodiment, only the aforesaid lens elements have refracting power, and the ocular optical system 10 includes only the three lens elements having the refracting power.

In addition, the relationship among the important parameters pertaining to the ocular optical system 10 in the first embodiment is indicated in FIG. 1 and FIG. 51. wherein EPD represents an exit pupil diameter of the ocular optical system 10 corresponding to a diameter of the pupil 2 of the observer, which is approximately 3 mm during the day and approximately 7 mm at night, as depicted in FIG. 1;

ER (eye relief) represents an exit pupil distance, which is a distance from the pupil 2 of the observer to the first lens element 3 along the optical axis I;

ω represents a half apparent field of view, which is one half the field of view of the observer, as depicted in FIG. 1;

T1 represents a thickness of the first lens element 3 along the optical axis I;

T2 represents a thickness of the second lens element 4 along the optical axis I;

T3 represents a thickness of the third lens element 5 along the optical axis I;

G12 represents a distance from the display-side surface 32 of the first lens element 3 to the eye-side surface 41 of the second lens element 4 along the optical axis I, which is an air gap from the first lens element 3 to the second lens element 4 along the optical axis I;

G23 represents a distance from the display-side surface 42 of the second lens element 4 to the eye-side surface 51 of the third lens element 5 along the optical axis I, which is an air gap from the second lens element 4 to the third lens element 5 along the optical axis I;

G3D represents a distance from the display-side surface 52 of the third lens element 5 to the display screen 100 along the optical axis I, which is an air gap from the third lens element 5 to the display screen 100 along the optical axis I;

DLD represents a diagonal length of the display screen 100 corresponding to one single pupil 2 of the observer, as depicted in FIG. 1;

a least distance of distinct vision is the closest distance that the eye is able to clearly focus on, which is normally 250 millimeters (mm) for young people, i.e., the least distance of distinct vision VD depicted in FIG. 1;

ALT represents a sum of the thicknesses of the first lens element 3, the second lens element 4, and the third lens element 5 along the optical axis I, i.e., a sum of T1, T2, and T3;

AGG represents a sum of two air gaps from the first lens element to the third lens element along the optical axis, i.e., a sum of G12 and G23;

TTL represents a distance from the eye-side surface 31 of the first lens element 3 to the display screen 100 along the optical axis I;

TL represents a distance from the eye-side surface 31 of the first lens element 3 to the display-side surface 52 of the third lens element 5 along the optical axis I;

SL represents a system length, which is a distance from the pupil 2 of the observer to the display screen 100 along the optical axis I; and EFL represents an effective focal length of the ocular optical system 10.

Besides, it is further defined that:
f1 is a focal length of the first lens element 3;
f2 is a focal length of the second lens element 4;
f3 is a focal length of the third lens element 5;
n1 is a refractive index of the first lens element 3;
n2 is a refractive index of the second lens element 4;
n3 is a refractive index of the third lens element 5;
ν1 is an Abbe number of the first lens element 3, and the Abbe number is also known as a dispersion coefficient;
ν2 is an Abbe number of the second lens element 4;
ν3 is an Abbe number of the third lens element 5;
D1 is a diameter of a clear aperture of the eye-side surface 31 of the first lens element 3;
D2 is a diameter of a clear aperture of the eye-side surface 41 of the second lens element 4; and
D3 is a diameter of a clear aperture of the eye-side surface 51 of the third lens element 5.

Other detailed optical data in the first embodiment are indicated in FIG. 9. In the first embodiment, the effective focal length (EFL) (i.e. system focal length) of the ocular optical system 10 is 47.427 mm, the half apparent field of view (ω) thereof is 42.775°, TTL thereof is 66.543 mm, EPD thereof is 2.000 mm, 0.5 times DLD thereof is 35.000 mm, and SL thereof is 77.236 mm. Among them, the effective radius in FIG. 9 refers to one half the diameter of the clear aperture.

Further, in the present embodiment, the eye-side surface 31 and the display-side surface 32 of the first lens element 3, the eye-side surface 41 and the display-side surface 42 of the second lens element 4, and the eye-side surface 51 and the display-side surface 52 of the third lens element 5 (six surfaces in total) are the aspheric surfaces. The aspheric surfaces are defined by the following formula.

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

wherein
Y: a distance from a point on an aspheric curve to the optical axis I;
Z: a depth of the aspheric surface (a vertical distance between the point on the aspheric surface that is spaced from the optical axis I by the distance Y and a tangent plane tangent to a vertex of the aspheric surface on the optical axis I);
R: a radius of curvature of the surface of the lens element close to the optical axis I;
K: a conic constant;
$a_i$: the $i^{th}$ aspheric coefficient.

The aspheric coefficients of the eye-side surfaces 31, 41, and 51 and the display-side surfaces 32, 42, and 52 in the formula (1) are indicated in FIG. 10. In FIG. 10, the referential number 31 is one row that represents the aspheric coefficient of the eye-side surface 31 of the first lens element 3, and the reference numbers in other rows can be deduced from the above.

Figures 8A, 8B, 8C, 8D:
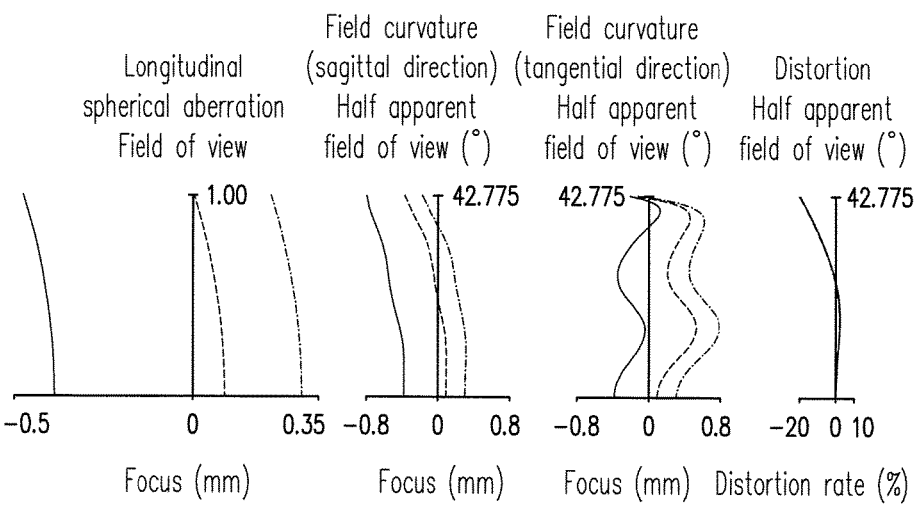
FIG. 8A to FIG. 8D illustrate a longitudinal spherical aberration and other aberrations of the ocular optical system according to the first embodiment of the invention.

Referring to FIG. 8A to FIG. 8D, FIG. 8A to FIG. 8D illustrate the aberrations of the ocular optical system 10 of the first embodiment, which are the aberrations obtained based on the assumption that the reversely tracking of the ray direction is the parallel imaging rays passing through the pupil 2 and the ocular optical system 10 in order from the eye-side and focused on the display screen 100 for imaging. In the present embodiment, each aberration behavior shown in each of the aberrations can decide the corresponding aberration behavior for imaging of the imaging rays from the display screen 100 on the retina of the eye of the observer. In other words, when each aberration behavior in each of the aberrations is smaller, each aberration behavior for imaging on the retina of the eye of the observer may also be smaller so the image with better imaging quality can be observed by the observer. FIG. 8A illustrates the longitudinal spherical aberration when a pupil radius thereof is 2 mm in the first embodiment. FIG. 8B and FIG. 8C illustrate a field curvature aberration in a sagittal direction and a field curvature aberration in a tangential direction on the display screen 100 when wavelengths are 486 nm, 587 nm and 656 nm in the first embodiment. FIG. 8D illustrates a distortion aberration on the display screen 100 when wavelengths are 486 nm, 587 nm and 656 nm in the first embodiment. In FIG. 8A which illustrates the longitudinal spherical aberration in the first embodiment, the curve of each wavelength is close to one another and approaches the center position, which indicates that the off-axis ray of each wavelength at different heights is concentrated around the imaging point. The skew margin of the curve of each wavelength indicates that the imaging point deviation of the off-axis ray at different heights is controlled within a range of ±0.48 mm. Hence, it is evident that the spherical aberration of the same wavelength can be significantly improved according to the present embodiment. In addition, the curves of the three representative wavelengths (red, green, and blue) are close to one another, which indicates that the imaging positions of the rays with different wavelengths are rather concentrated; therefore, the chromatic aberration can be significantly improved as well.

In FIG. 8B and FIG. 8C which illustrate two diagrams of field curvature aberrations, the focal length variation of the three representative wavelengths within the entire field of view falls within the range of ±0.8 mm, which indicates that aberration of the optical system provided in the first embodiment can be effectively eliminated. In FIG. 8D, the diagram of distortion aberration shows that the distortion aberration in the first embodiment can be maintained within the range of ±21%, which indicates that the distortion aberration in the first embodiment can comply with the imaging quality requirement of the optical system. Accordingly, compared to the existing ocular optical system, the ocular optical system provided in the first embodiment can have the favorable imaging quality, given that SL is shortened to about 77.236 mm. As a result, according to the first embodiment, the length of the optical system can be shortened and the apparent field of view can be enlarged without sacrificing the favorable optical properties. In this way, the product design with miniaturization, low aberration and large apparent field of view taken into account can be realized.

Figure 11:
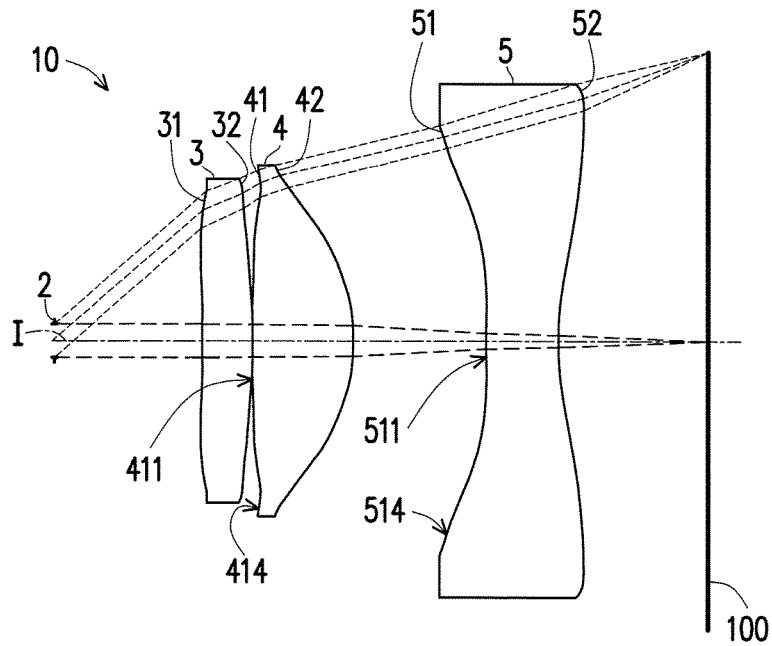
FIG. 11 is a schematic view illustrating an ocular optical system according to a second embodiment of the invention.

FIG. 11 is a schematic view illustrating an ocular optical system according to the second embodiment of the invention, and FIG. 12A to FIG. 12D illustrate a longitudinal spherical aberration and other aberrations of the ocular optical system according to the second embodiment of the invention. With reference to FIG. 11, the ocular optical system 10 according to the second embodiment of the invention is similar to that provided in the first embodiment, while the differences therebetween are as follows. The optical data, the aspheric coefficients, and the parameters of the lens elements 3, 4, and 5 in these two embodiments are different to some extent. Further, in the present embodiment, the eye-side surface 41 of the second lens element 4 has a convex portion 411 in a vicinity of the optical axis I and a concave portion 414 in a vicinity of a periphery of the second lens element 4. Moreover, in the present embodiment, the eye-side surface 51 of the third lens element 5 has a convex portion 511 in a vicinity of the optical axis I and a concave portion 514 in a vicinity of a periphery of the third lens element 5. For clear illustration, it should be mentioned that the same reference numbers of the concave portions and the convex portions in the two embodiments are omitted from FIG. 11.

Detailed optical data of the ocular optical system 10 in the second embodiment are indicated in FIG. 13. In the second embodiment, EFL of the ocular optical system 10 is 48.928 mm, ω thereof is 41.000°, TTL thereof is 61.725 mm, EPD thereof is 2.000 mm, 0.5 times DLD thereof is 35.000 mm, and SL thereof is 79.881 mm.

The aspheric coefficients of the eye-side surfaces 31, 41, and 51 and the display-side surfaces 32, 42, and 52 in the formula (1) are indicated in FIG. 14 according to the second embodiment.

In addition, the relationship among the important parameters pertaining to the ocular optical system 10 in the second embodiment is indicated in FIG. 51.

Figures 12A, 12B, 12C, 12D:
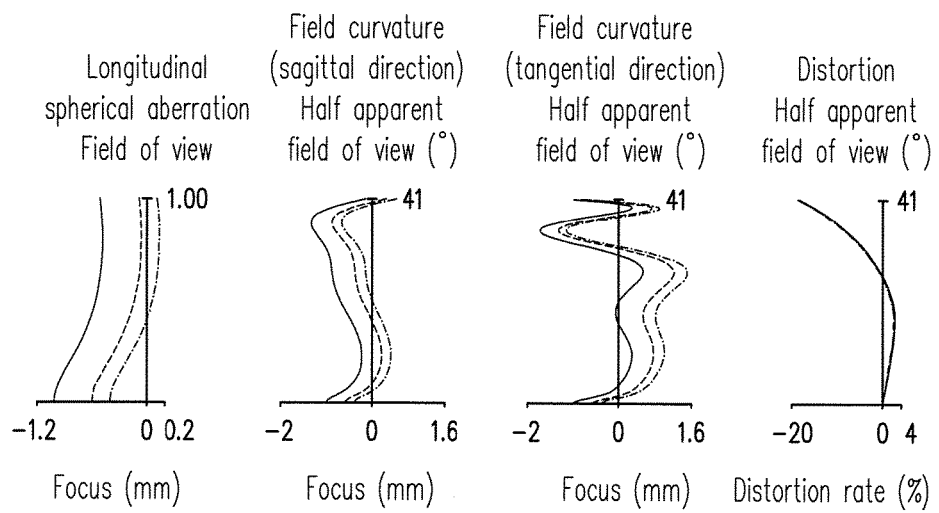
FIG. 12A to FIG. 12D illustrate a longitudinal spherical aberration and other aberrations of the ocular optical system according to the second embodiment of the invention.

In FIG. 12A which illustrates the longitudinal spherical aberration when the pupil radius is 2.0000 mm according to the second embodiment, the imaging point deviation of the off-axis ray at different heights is controlled within a range of ±1.1 mm. In FIG. 12B and FIG. 12C which illustrate two diagrams of field curvature aberrations, the focal length variation of the three representative wavelengths within the entire field of view falls within the range of ±1.8 mm. In FIG. 12D, the diagram of distortion aberration shows that the distortion aberration in the second embodiment can be maintained within the range of ±20%. Accordingly, compared to the existing ocular optical system, the second embodiment can have the favorable imaging quality, given that SL is shortened to about 79.881 mm.

According to the above description, compared to the first embodiment, the advantages of the second embodiment are as follows. The distortion in the second embodiment is less than that in the first embodiment. Besides, because a thickness difference between portions in a vicinity of the optical axis and in a vicinity of a periphery of the lens element in the second embodiment is less than that of the first embodiment, the ocular optical system in the second embodiment is, in comparison with that provided in the first embodiment, easier to be manufactured and thus has higher yield.

Figure 15:
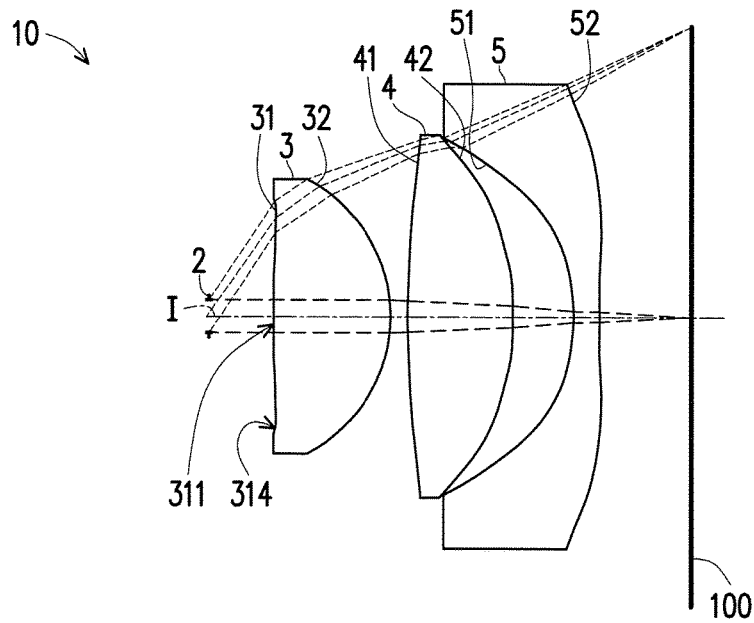
FIG. 15 is a schematic view illustrating an ocular optical system according to a third embodiment of the invention.

FIG. 15 is a schematic view illustrating an ocular optical system according to the third embodiment of the invention, and FIG. 16A to FIG. 16D illustrate a longitudinal spherical aberration and other aberrations of the ocular optical system according to the third embodiment of the invention. With reference to FIG. 15, the ocular optical system 10 according to the third embodiment of the invention is similar to that provided in the first embodiment, while the differences therebetween are as follows. The optical data, the aspheric coefficients, and the parameters of the lens elements 3, 4, and 5 in these two embodiments are different to some extent. Further, in the present embodiment, the eye-side surface 31 of the first lens element 3 has a convex portion 311 in a vicinity of the optical axis I and a concave portion 314 in a vicinity of a periphery of the first lens element 3. For clear illustration, it should be mentioned that the same reference numbers of the concave portions and the convex portions in the two embodiments are omitted from FIG. 15.

Detailed optical data of the ocular optical system 10 in the third embodiment are indicated in FIG. 17. In the third embodiment, EFL of the ocular optical system 10 is 33.624 mm, ω thereof is 56.157°, TTL thereof is 50.411 mm, EPD thereof is 2.000 mm, 0.5 times DLD thereof is 35.000 mm, and SL thereof is 58.411 mm.

The aspheric coefficients of the eye-side surfaces 31, 41, and 51 and the display-side surfaces 32, 42, and 52 in the formula (1) are indicated in FIG. 18 according to the third embodiment.

In addition, the relationship among the important parameters pertaining to the ocular optical system 10 in the third embodiment is indicated in FIG. 51.

Figures 16A, 16B, 16C, 16D:
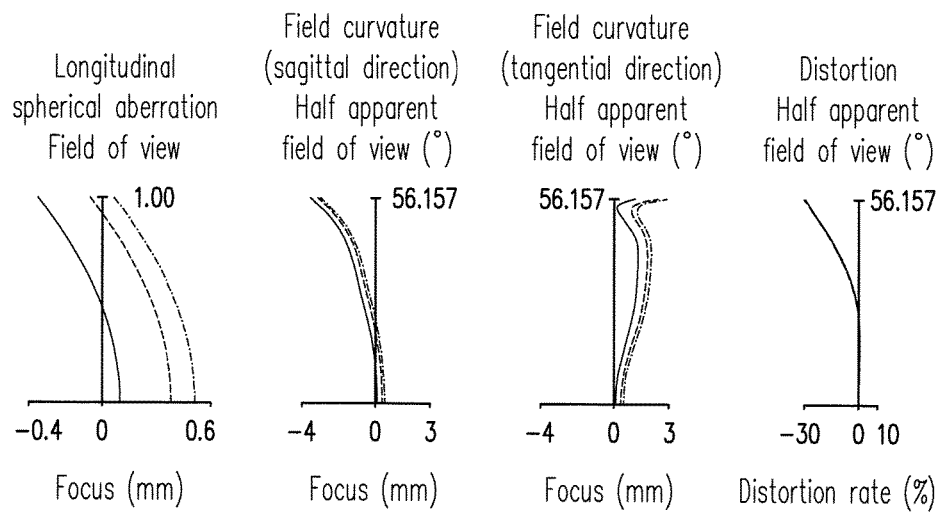
FIG. 16A to FIG. 16D illustrate a longitudinal spherical aberration and other aberrations of the ocular optical system according to the third embodiment of the invention.

In FIG. 16A which illustrates the longitudinal spherical aberration when the pupil radius is 2.0000 mm according to the third embodiment, the imaging point deviation of the off-axis ray at different heights is controlled within a range of ±0.52 mm. In FIG. 16B and FIG. 16C which illustrate two diagrams of field curvature aberrations, the focal length variation of the three representative wavelengths within the entire field of view falls within the range of ±3.6 mm. In FIG. 16D, the diagram of distortion aberration shows that the distortion aberration in the third embodiment can be maintained within the range of ±30%. Accordingly, compared to the existing ocular optical system, the ocular optical system provided in the third embodiment can have the favorable imaging quality, given that the system length SL is shortened to about 58.411 mm.

According to the above description, compared to the first embodiment, the advantages of the third embodiment are as follows. The system length SL of the ocular optical system 10 in the third embodiment is less than the system length SL in the first embodiment; the half apparent field of view ω in the third embodiment is greater than the half apparent field of view ω in the first embodiment.

Figure 19:
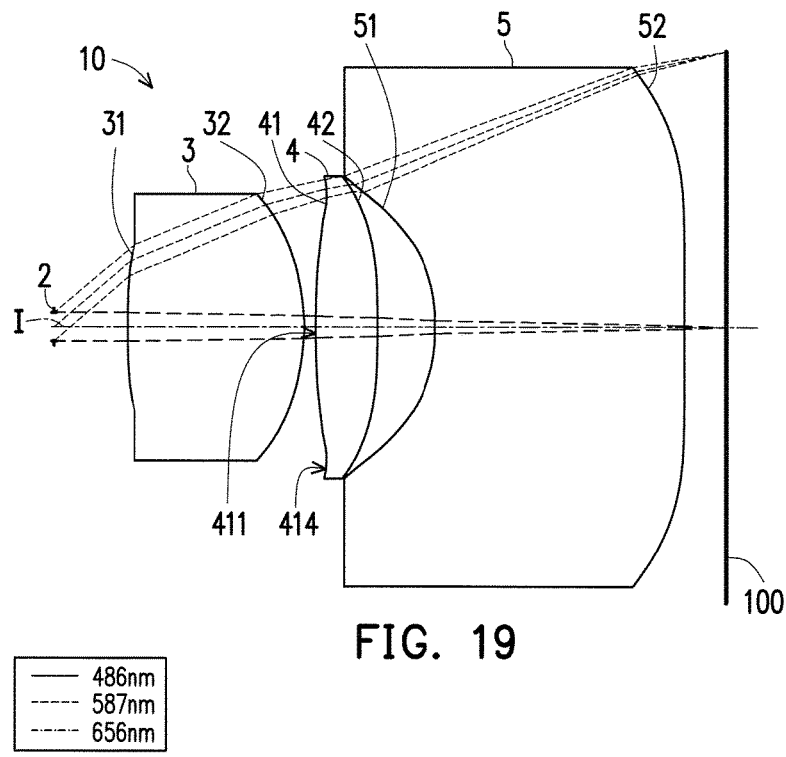
FIG. 19 is a schematic view illustrating an ocular optical system according to a fourth embodiment of the invention.

FIG. 19 is a schematic view illustrating an ocular optical system according to the fourth embodiment of the invention, and FIG. 20A to FIG. 20D illustrate a longitudinal spherical aberration and other aberrations of the ocular optical system according to the fourth embodiment of the invention. With reference to FIG. 19, the ocular optical system 10 according to the fourth embodiment of the invention is similar to that provided in the first embodiment, while differences therebetween are as follows. The optical data, the aspheric coefficients, and the parameters of the lens elements 3, 4, and 5 in these two embodiments are different to some extent. Further, in the present embodiment, the eye-side surface 41 of the second lens element 4 has a convex portion 411 in a vicinity of the optical axis I and a concave portion 414 in a vicinity of a periphery of the second lens element 4. For clear illustration, it should be mentioned that the same reference numbers of the concave portions and the convex portions in the two embodiments are omitted from FIG. 19.

Detailed optical data of the ocular optical system 10 in the fourth embodiment are indicated in FIG. 21. In the fourth embodiment, EFL of the ocular optical system 10 is 61.299 mm, ω thereof is 40.975°, TTL thereof is 86.102 mm, EPD thereof is 2.000 mm, 0.5 times DLD thereof is 39.459 mm, and SL thereof is 96.558 mm.

The aspheric coefficients of the eye-side surfaces 31, 41, and 51 and the display-side surfaces 32, 42, and 52 in the formula (1) are indicated in FIG. 22 according to the fourth embodiment.

In addition, the relationship among the important parameters pertaining to the ocular optical system 10 in the fourth embodiment is indicated in FIG. 51.

Figures 20A, 20B, 20C, 20D:
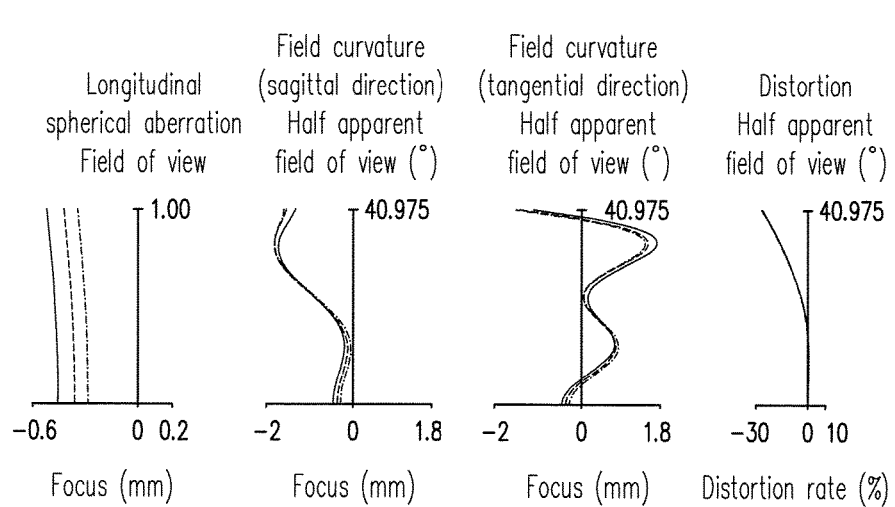
FIG. 20A to FIG. 20D illustrate a longitudinal spherical aberration and other aberrations of the ocular optical system according to the fourth embodiment of the invention.

In FIG. 20A which illustrates the longitudinal spherical aberration when the pupil radius is 2.0000 mm according to the fourth embodiment, the imaging point deviation of the off-axis ray at different heights is controlled within a range of ±0.54 mm. In FIG. 20B and FIG. 20C which illustrate two diagrams of field curvature aberrations, the focal length variation of the three representative wavelengths within the entire field of view falls within the range of ±1.9 mm. In FIG. 20D, the diagram of distortion aberration shows that the distortion aberration in the fourth embodiment can be maintained within the range of ±28%. Accordingly, compared to the existing ocular optical system, the ocular optical system provided in the fourth embodiment can have the favorable imaging quality, given that the system length SL is shortened to about 96.558 mm.

According to the above description, compared to the first embodiment, the advantages of the fourth embodiment are as follows. Because a thickness difference between portions in a vicinity of the optical axis and in a vicinity of a periphery of the lens element in the fourth embodiment is less than that of the first embodiment, the ocular optical system in the fourth embodiment is, in comparison with that provided in the first embodiment, easier to be manufactured and thus has higher yield.

Figure 23:
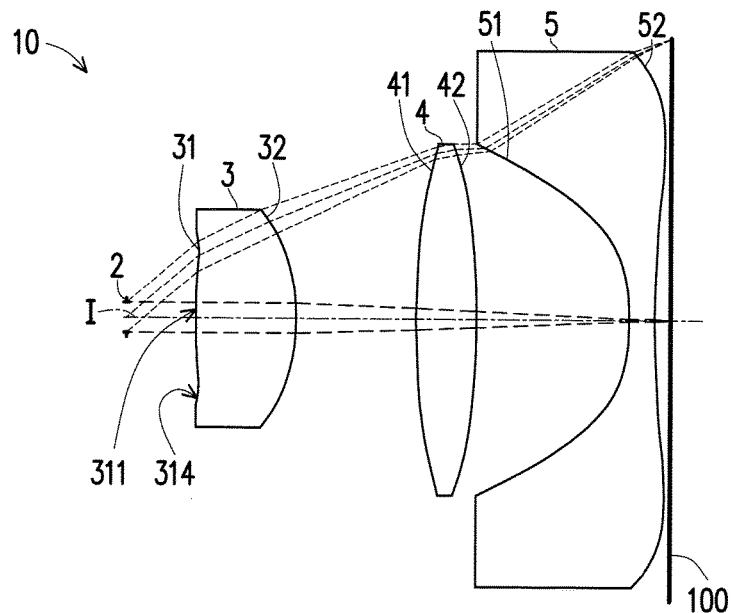
FIG. 23 is a schematic view illustrating an ocular optical system according to a fifth embodiment of the invention.

FIG. 23 is a schematic view illustrating an ocular optical system according to the fifth embodiment of the invention, and FIG. 24A to FIG. 24D illustrate a longitudinal spherical aberration and other aberrations of the ocular optical system according to the fifth embodiment of the invention. With reference to FIG. 23, the ocular optical system 10 according to the fifth embodiment of the invention is similar to that provided in the first embodiment, while the differences are as follows. The optical data, the aspheric coefficients, and the parameters of the lens elements 3, 4, and 5 in these two embodiments are different to some extent. Further, in the present embodiment, the eye-side surface 31 of the first lens element 3 has a convex portion 311 in a vicinity of the optical axis I and a concave portion 314 in a vicinity of a periphery of the first lens element 3. For clear illustration, it should be mentioned that the same reference numbers of the concave portions and the convex portions in the two embodiments are omitted from FIG. 23.

Detailed optical data of the ocular optical system 10 in the fifth embodiment are indicated in FIG. 25. In the fifth embodiment, EFL of the ocular optical system 10 is 43.758 mm, ω thereof is 40.996°, TTL thereof is 62.359 mm, EPD thereof is 2.000 mm, 0.5 times DLD thereof is 36.608 mm, and SL thereof is 71.570 mm.

The aspheric coefficients of the eye-side surfaces 31, 41, and 51 and the display-side surfaces 32, 42, and 52 in the formula (1) are indicated in FIG. 26 according to the fifth embodiment.

In addition, the relationship among the important parameters pertaining to the ocular optical system 10 in the fifth embodiment is indicated in FIG. 51.

Figures 24A, 24B, 24C, 24D:
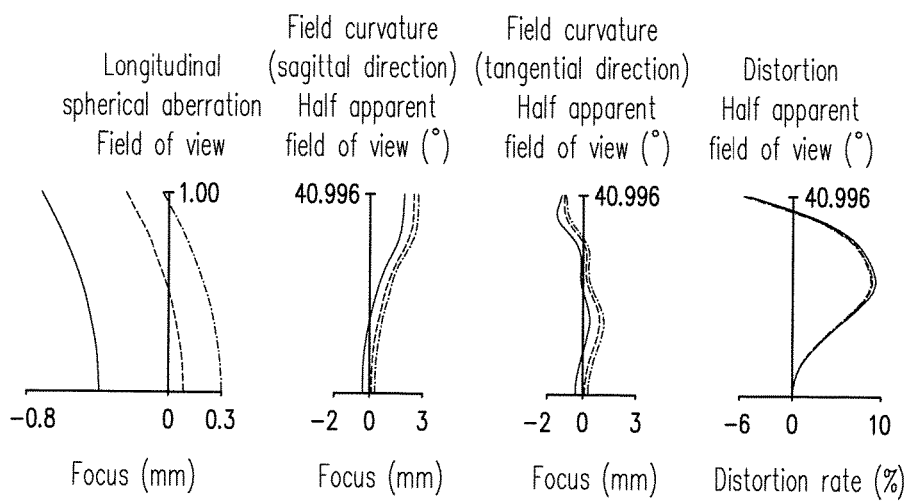
FIG. 24A to FIG. 24D illustrate a longitudinal spherical aberration and other aberrations of the ocular optical system according to the fifth embodiment of the invention.

In FIG. 24A which illustrates the longitudinal spherical aberration when the pupil radius is 2.0000 mm according to the fifth embodiment, the imaging point deviation of the off-axis ray at different heights is controlled within a range of ±0.73 mm. In FIG. 24B and FIG. 24C which illustrate two diagrams of field curvature aberrations, the focal length variation of the three representative wavelengths within the entire field of view falls within the range of ±2.9 mm. In FIG. 24D, the diagram of distortion aberration shows that the distortion aberration in the fifth embodiment can be maintained within the range of ±6%. Accordingly, compared to the existing ocular optical system, the ocular optical system provided in the fifth embodiment can have the favorable imaging quality, given that the system length SL is shortened to about 71.570 mm.

According to the above description, compared to the first embodiment, the advantages of the fifth embodiment are as follows. The system length SL of the fifth embodiment is less than that of the first embodiment. The distortion of the fifth embodiment is less than the distortion of the first embodiment.

Figure 27:
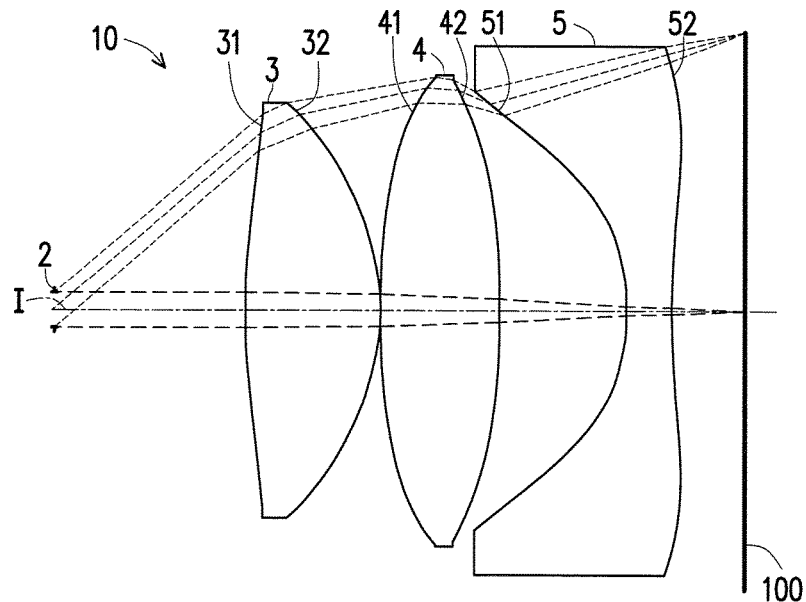
FIG. 27 is a schematic view illustrating an ocular optical system according to a sixth embodiment of the invention.

FIG. 27 is a schematic view illustrating an ocular optical system according to the sixth embodiment of the invention, and FIG. 28A to FIG. 28D illustrate a longitudinal spherical aberration and other aberrations of the ocular optical system according to the sixth embodiment of the invention. With reference to FIG. 27, the ocular optical system 10 according to the sixth embodiment of the invention is similar to that provided in the first embodiment, while the differences therebetween are as follows. The optical data, the aspheric coefficients, and the parameters of the lens elements 3, 4, and 5 in these two embodiments are different to some extent. For clear illustration, it should be mentioned that the same reference numbers of the concave portions and the convex portions in the two embodiments are omitted from FIG. 27.

Detailed optical data of the ocular optical system 10 in the sixth embodiment are indicated in FIG. 29. In the sixth embodiment, EFL of the ocular optical system 10 is 45.853 mm, ω thereof is 40.551°, TTL thereof is 57.724 mm, EPD thereof is 2.000 mm, 0.5 times DLD thereof is 31.956 mm, and SL thereof is 79.996 mm.

The aspheric coefficients of the eye-side surfaces 31, 41, and 51 and the display-side surfaces 32, 42, and 52 in the formula (1) are indicated in FIG. 30 according to the sixth embodiment.

In addition, the relationship among the important parameters pertaining to the ocular optical system 10 in the sixth embodiment is indicated in FIG. 52.

Figures 28A, 28B, 28C, 28D:
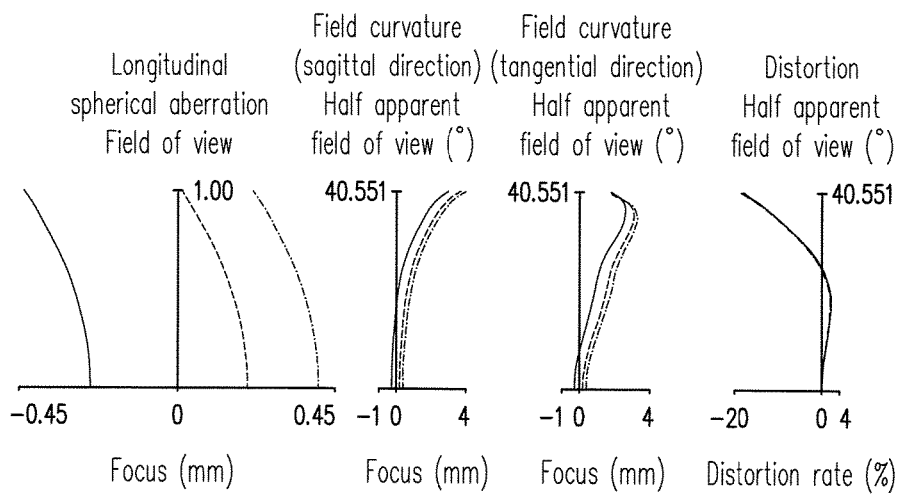
FIG. 28A to FIG. 28D illustrate a longitudinal spherical aberration and other aberrations of the ocular optical system according to the sixth embodiment of the invention.

In FIG. 28A which illustrates the longitudinal spherical aberration when the pupil radius is 2.0000 mm according to the sixth embodiment, the imaging point deviation of the off-axis ray at different heights is controlled within a range of ±0.45 mm. In FIG. 28B and FIG. 28C which illustrate two diagrams of field curvature aberrations, the focal length variation of the three representative wavelengths within the entire field of view falls within the range of ±4 mm. In FIG. 28D, the diagram of distortion aberration shows that the distortion aberration in the sixth embodiment can be maintained within the range of ±19%. Accordingly, compared to the existing ocular optical system, the ocular optical system provided in the sixth embodiment can have the favorable imaging quality, given that the system length SL is shortened to about 79.996 mm.

According to the above description, compared to the first embodiment, the advantages of the sixth embodiment are as follows. The longitudinal spherical aberration in the sixth embodiment is less than the longitudinal spherical aberration in the first embodiment; and the distortion in the sixth embodiment is less than the distortion in the first embodiment.

FIG. 31 is a schematic view illustrating an ocular optical system according to the seventh embodiment of the invention, and FIG. 32A to FIG. 32D illustrate a longitudinal spherical aberration and other aberrations of the ocular optical system according to the seventh embodiment of the invention. With reference to FIG. 31, the ocular optical system 10 according to the seventh embodiment of the invention is similar to that provided in the first embodiment, while the differences therebetween are as follows. The optical data, the aspheric coefficients, and the parameters of the lens elements 3, 4, and 5 in these two embodiments are different to some extent. For clear illustration, it should be mentioned that the same reference numbers of the concave portions and the convex portions in the two embodiments are omitted from FIG. 31.

Detailed optical data of the ocular optical system 10 in the seventh embodiment are indicated in FIG. 33. In the seventh embodiment, EFL of the ocular optical system 10 is 61.919 mm, ω thereof is 41.000°, TTL thereof is 80.258 mm, EPD thereof is 2.000 mm, 0.5 times DLD thereof is 44.369 mm, and SL thereof is 92.925 mm.

The aspheric coefficients of the eye-side surfaces 31, 41, and 51 and the display-side surfaces 32, 42, and 52 in the formula (1) are indicated in FIG. 34 according to the seventh embodiment.

In addition, the relationship among the important parameters pertaining to the ocular optical system 10 in the seventh embodiment is indicated in FIG. 52.

In FIG. 32A which illustrates the longitudinal spherical aberration when the pupil radius is 2.0000 mm according to the seventh embodiment, the imaging point deviation of the off-axis ray at different heights is controlled within a range of ±0.9 mm. In FIG. 32B and FIG. 32C which illustrate two diagrams of field curvature aberrations, the focal length variation of the three representative wavelengths within the entire field of view falls within the range of ±1.9 mm. In FIG. 32D, the diagram of distortion aberration shows that the distortion aberration in the seventh embodiment can be maintained within the range of ±19%. Accordingly, compared to the existing ocular optical system, the ocular optical system provided in the seventh embodiment can have the favorable imaging quality, given that the system length SL is shortened to about 92.925 mm.

According to the above description, compared to the first embodiment, the advantages of the seventh embodiment are as follows. The distortion aberration of the seventh embodiment is less than the distortion aberration of the first embodiment. Besides, because a thickness difference between portions in a vicinity of the optical axis and in a vicinity of a periphery of the lens element in the seventh embodiment is less than that of the first embodiment, the ocular optical system in the seventh embodiment is, in comparison with that provided in the first embodiment, easier to be manufactured and thus has higher yield.

Figure 35:
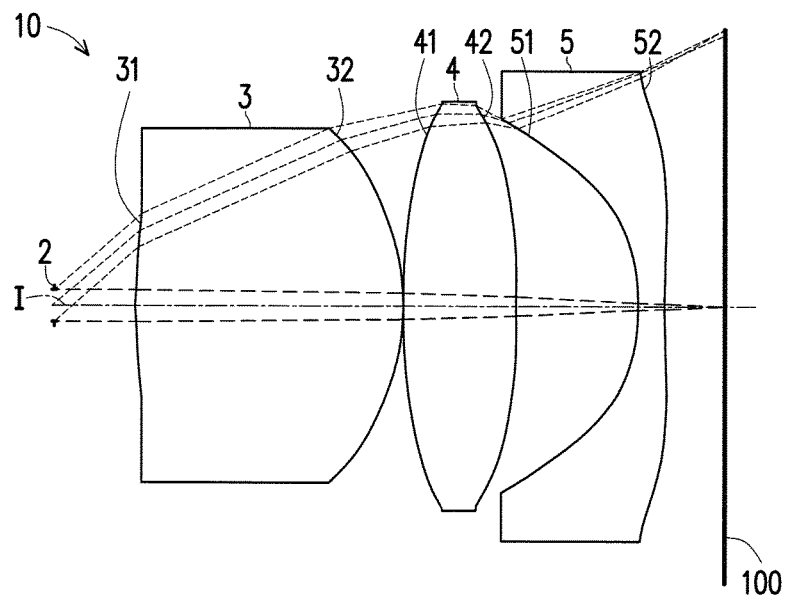
FIG. 35 is a schematic view illustrating an ocular optical system according to an eighth embodiment of the invention.

FIG. 35 is a schematic view illustrating an ocular optical system according to the eighth embodiment of the invention, and FIG. 36A to FIG. 36D illustrate a longitudinal spherical aberration and other aberrations of the ocular optical system according to the eighth embodiment of the invention. With reference to FIG. 35, the ocular optical system 10 according to the eighth embodiment of the invention is similar to that provided in the first embodiment, while the differences therebetween are as follows. The optical data, the aspheric coefficients, and the parameters of the lens elements 3, 4, and 5 in these two embodiments are different to some extent. For clear illustration, it should be mentioned that the same reference numbers of the concave portions and the convex portions in the two embodiments are omitted from FIG. 35.

Detailed optical data of the ocular optical system 10 in the eighth embodiment are indicated in FIG. 37. In the eighth embodiment, EFL of the ocular optical system 10 is 45.381 mm, ω thereof is 40.977°, TTL thereof is 75.038 mm, EPD thereof is 2.000 mm, 0.5 times DLD thereof is 35.240 mm, and SL thereof is 85.651 mm.

The aspheric coefficients of the eye-side surfaces 31, 41, and 51 and the display-side surfaces 32, 42, and 52 in the formula (1) are indicated in FIG. 38 according to the eighth embodiment.

In addition, the relationship among the important parameters pertaining to the ocular optical system 10 in the eighth embodiment is indicated in FIG. 52.

Figures 36A, 36B, 36C, 36D:
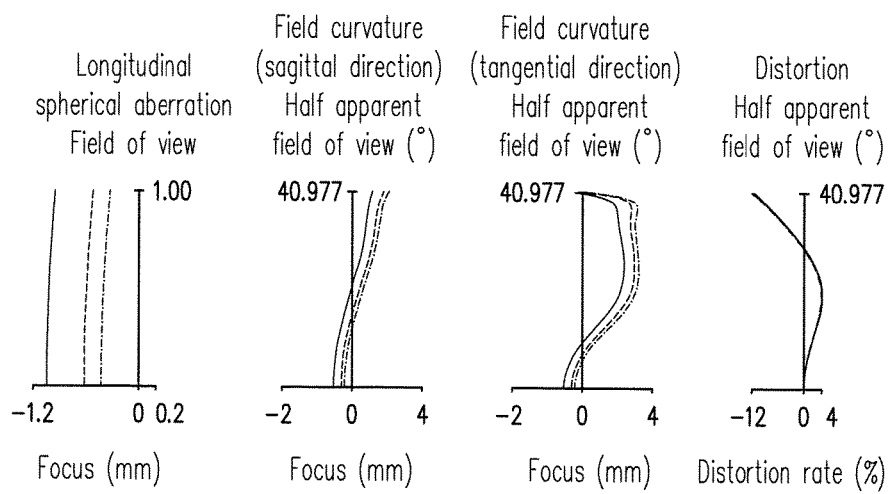
FIG. 36A to FIG. 36D illustrate a longitudinal spherical aberration and other aberrations of the ocular optical system according to the eighth embodiment of the invention.

In FIG. 36A which illustrates the longitudinal spherical aberration when the pupil radius is 2.0000 mm according to the eighth embodiment, the imaging point deviation of the off-axis ray at different heights is controlled within a range of ±1.1 mm. In FIG. 36B and FIG. 36C which illustrate two diagrams of field curvature aberrations, the focal length variation of the three representative wavelengths within the entire field of view falls within the range of ±3.5 mm. In FIG. 36D, the diagram of distortion aberration shows that the distortion aberration in the eighth embodiment can be maintained within the range of ±13%. Accordingly, compared to the existing ocular optical system, the ocular optical system provided in the eighth embodiment can have the favorable imaging quality, given that the system length SL is shortened to about 85.651 mm.

According to the above description, compared to the first embodiment, the advantages of the eighth embodiment are as follows. The distortion aberration of the eighth embodiment is less than the distortion aberration of the first embodiment. Besides, because a thickness difference between portions in a vicinity of the optical axis and in a vicinity of a periphery of the lens element in the eighth embodiment is less than that of the first embodiment, the ocular optical system in the eighth embodiment is, in comparison with that provided in the first embodiment, easier to be manufactured and thus has higher yield.

Figure 39:
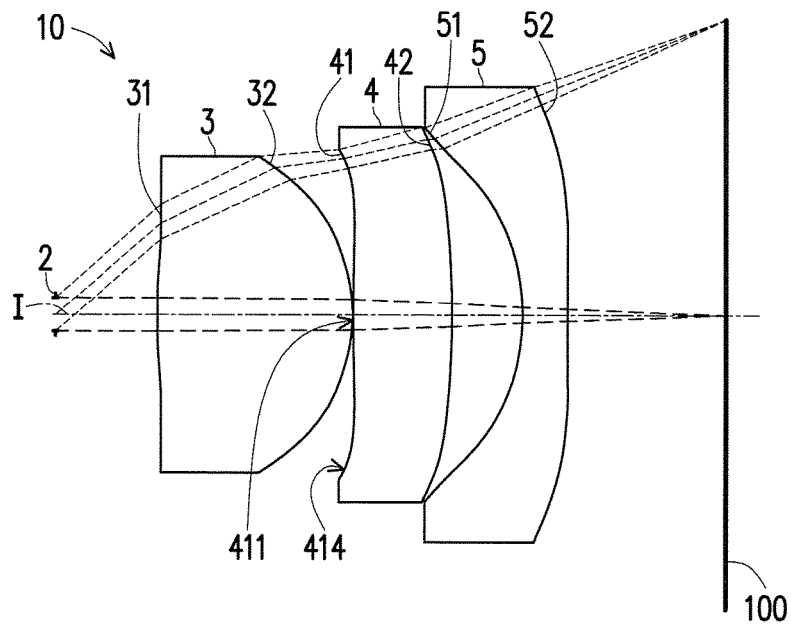
FIG. 39 is a schematic view illustrating an ocular optical system according to a ninth embodiment of the invention.

FIG. 39 is a schematic view illustrating an ocular optical system according to the ninth embodiment of the invention, and FIG. 40A to FIG. 40D illustrate a longitudinal spherical aberration and other aberrations of the ocular optical system according to the ninth embodiment of the invention. With reference to FIG. 39, the ocular optical system 10 according to the ninth embodiment of the invention is similar to that provided in the first embodiment, while the differences therebetween are as follows. The optical data, the aspheric coefficients, and the parameters of the lens elements 3, 4, and 5 in these two embodiments are different to some extent. Moreover, in this embodiment, the eye-side surface 41 of the second lens element 4 has a convex portion 411 in a vicinity of the optical axis I and a concave portion 414 in a vicinity of a periphery of the second lens element 4. For clear illustration, it should be mentioned that the same reference numbers of the concave portions and the convex portions in the two embodiments are omitted from FIG. 39.

Detailed optical data of the ocular optical system 10 in the ninth embodiment are indicated in FIG. 41. In the ninth embodiment, EFL of the ocular optical system 10 is 50.614 mm, ω thereof is 41.000°, TTL thereof is 67.726 mm, EPD thereof is 2.000 mm, 0.5 times DLD thereof is 35.000 mm, and SL thereof is 79.994 mm.

The aspheric coefficients of the eye-side surfaces 31, 41, and 51 and the display-side surfaces 32, 42, and 52 in the formula (1) are indicated in FIG. 42 according to the ninth embodiment.

In addition, the relationship among the important parameters pertaining to the ocular optical system 10 in the ninth embodiment is indicated in FIG. 52.

Figures 40A, 40B, 40C, 40D:
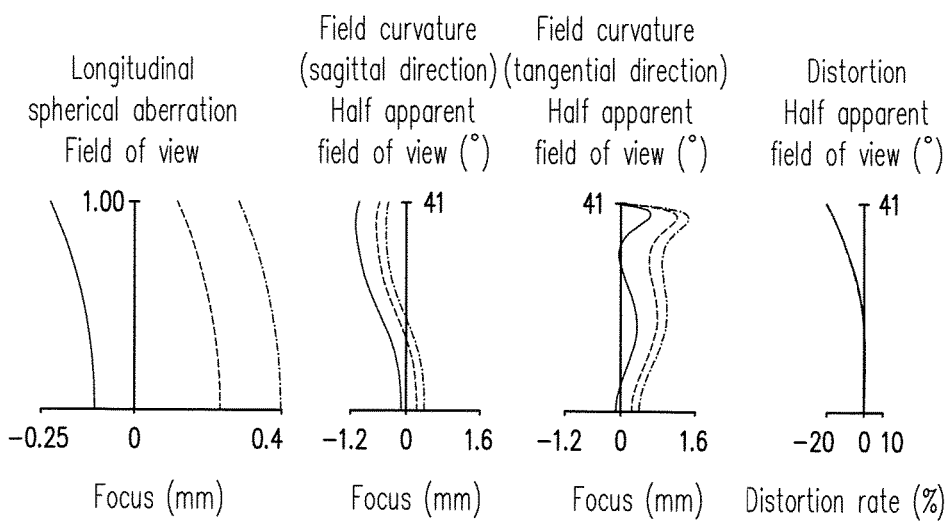
FIG. 40A to FIG. 40D illustrate a longitudinal spherical aberration and other aberrations of the ocular optical system according to the ninth embodiment of the invention.

In FIG. 40A which illustrates the longitudinal spherical aberration when the pupil radius is 2.0000 mm according to the ninth embodiment, the imaging point deviation of the off-axis ray at different heights is controlled within a range of ±0.4 mm. In FIG. 40B and FIG. 40C which illustrate two diagrams of field curvature aberrations, the focal length variation of the three representative wavelengths within the entire field of view falls within the range of ±1.5 mm. In FIG. 40D, the diagram of distortion aberration shows that the distortion aberration in the ninth embodiment can be maintained within the range of ±21%. Accordingly, compared to the existing ocular optical system, the ocular optical system provided in the ninth embodiment can have the favorable imaging quality, given that the system length SL is shortened to about 79.994 mm.

According to the above description, compared to the first embodiment, the advantages of the ninth embodiment are as follows. The longitudinal spherical aberration of the ninth embodiment is less than that of the first embodiment. Besides, because a thickness difference between portions in a vicinity of the optical axis and in a vicinity of a periphery of the lens element in the ninth embodiment is less than that of the first embodiment, the ocular optical system in the ninth embodiment is, in comparison with that provided in the first embodiment, easier to be manufactured and thus has higher yield.

Figure 43:
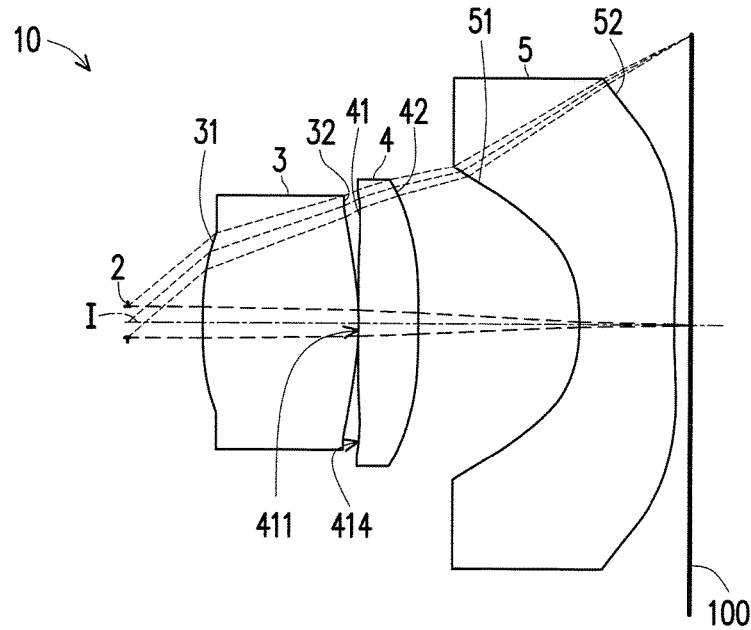
FIG. 43 is a schematic view illustrating an ocular optical system according to a tenth embodiment of the invention.

FIG. 43 is a schematic view illustrating an ocular optical system according to the tenth embodiment of the invention, and FIG. 44A to FIG. 44D illustrate a longitudinal spherical aberration and other aberrations of the ocular optical system according to the tenth embodiment of the invention. With reference to FIG. 43, the ocular optical system 10 according to the tenth embodiment of the invention is similar to that provided in the first embodiment, while the differences therebetween are as follows. The optical data, the aspheric coefficients, and the parameters of the lens elements 3, 4, and 5 in these two embodiments are different to some extent. Moreover, in this embodiment, the eye-side surface 41 of the second lens element 4 has a convex portion 411 in a vicinity of the optical axis I and a concave portion 414 in a vicinity of a periphery of the second lens element 4. For clear illustration, it should be mentioned that the same reference numbers of the concave portions and the convex portions in the two embodiments are omitted from FIG. 43.

Detailed optical data of the ocular optical system 10 in the tenth embodiment are indicated in FIG. 45. In the tenth embodiment, EFL of the ocular optical system 10 is 47.427 mm, ω thereof is 42.775°, TTL thereof is 66.543 mm, EPD thereof is 2.000 mm, 0.5 times DLD thereof is 35.000 mm, and SL thereof is 77.236 mm.

The aspheric coefficients of the eye-side surfaces 31, 41, and 51 and the display-side surfaces 32, 42, and 52 in the formula (1) are indicated in FIG. 46 according to the tenth embodiment.

In addition, the relationship among the important parameters pertaining to the ocular optical system 10 in the tenth embodiment is indicated in FIG. 52.

Figures 44A, 44B, 44C, 44D:
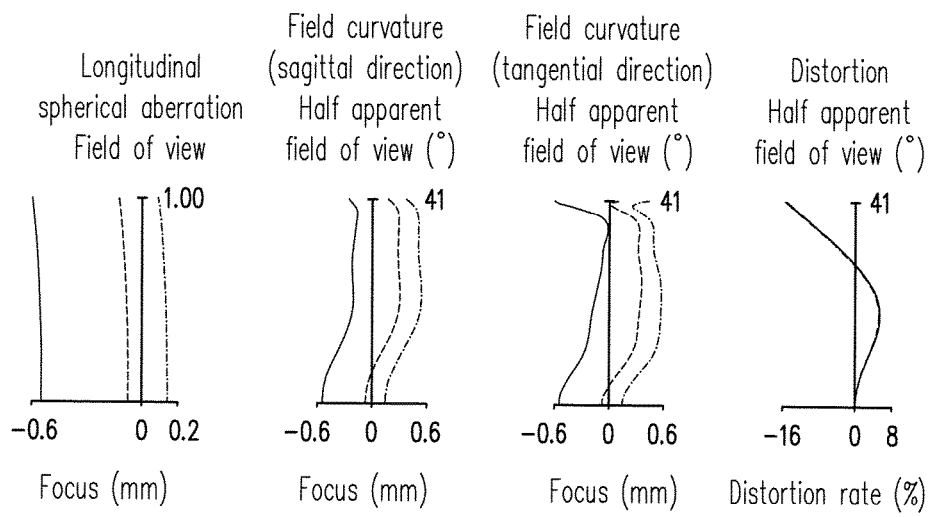
FIG. 44A to FIG. 44D illustrate a longitudinal spherical aberration and other aberrations of the ocular optical system according to the tenth embodiment of the invention.

In FIG. 44A which illustrates the longitudinal spherical aberration when the pupil radius is 2.0000 mm according to the tenth embodiment, the imaging point deviation of the off-axis ray at different heights is controlled within a range of ±0.6 mm. In FIG. 44B and FIG. 44C which illustrate two diagrams of field curvature aberrations, the focal length variation of the three representative wavelengths within the entire field of view falls within the range of ±0.6 mm. In FIG. 44D, the diagram of distortion aberration shows that the distortion aberration in the tenth embodiment can be maintained within the range of ±16%. Accordingly, compared to the existing ocular optical system, the ocular optical system provided in the tenth embodiment can have the favorable imaging quality, given that the system length SL is shortened to about 77.236 mm.

According to the above description, compared to the first embodiment, the advantages of the tenth embodiment are as follows. The field curvature of the tenth embodiment is less than that of the first embodiment. The distortion of the tenth embodiment is less than that of the first embodiment. Besides, because a thickness difference between portions in a vicinity of the optical axis and in a vicinity of a periphery of the lens element in the tenth embodiment is less than that of the first embodiment, the ocular optical system in the tenth embodiment is, in comparison with that provided in the first embodiment, easier to be manufactured and thus has higher yield.

Figure 47:
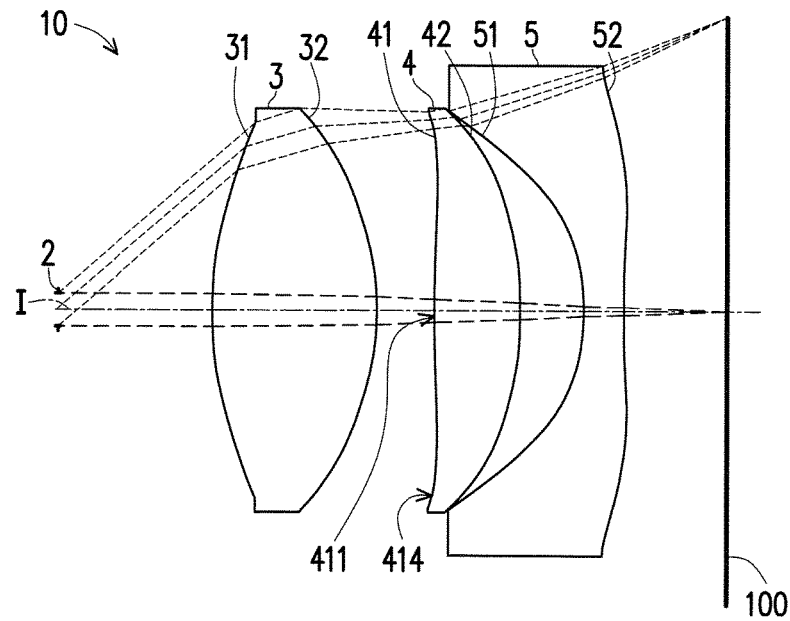
FIG. 47 is a schematic view illustrating an ocular optical system according to an eleventh embodiment of the invention.

FIG. 47 is a schematic view illustrating an ocular optical system according to the eleventh embodiment of the invention, and FIG. 48A to FIG. 48D illustrate a longitudinal spherical aberration and other aberrations of the ocular optical system according to the eleventh embodiment of the invention. With reference to FIG. 47, the ocular optical system 10 according to the eleventh embodiment of the invention is similar to that provided in the first embodiment, while the differences therebetween are as follows. The optical data, the aspheric coefficients, and the parameters of the lens elements 3, 4, and 5 in these two embodiments are different to some extent. Moreover, in this embodiment, the eye-side surface 41 of the second lens element 4 has a convex portion 411 in a vicinity of the optical axis I and a concave portion 414 in a vicinity of a periphery of the second lens element 4. For clear illustration, it should be mentioned that the same reference numbers of the concave portions and the convex portions in the two embodiments are omitted from FIG. 47.

Detailed optical data of the ocular optical system 10 in the eleventh embodiment are indicated in FIG. 49. In the eleventh embodiment, EFL of the ocular optical system 10 is 49.186 mm, ω thereof is 41.000°, TTL thereof is 61.444 mm, EPD thereof is 2.000 mm, 0.5 times DLD thereof is 35.000 mm, and SL thereof is 80.000 mm.

The aspheric coefficients of the eye-side surfaces 31, 41, and 51 and the display-side surfaces 32, 42, and 52 in the formula (1) are indicated in FIG. 50 according to the eleventh embodiment.

In addition, the relationship among the important parameters pertaining to the ocular optical system 10 in the eleventh embodiment is indicated in FIG. 52.

Figures 48A, 48B, 48C, 48D:
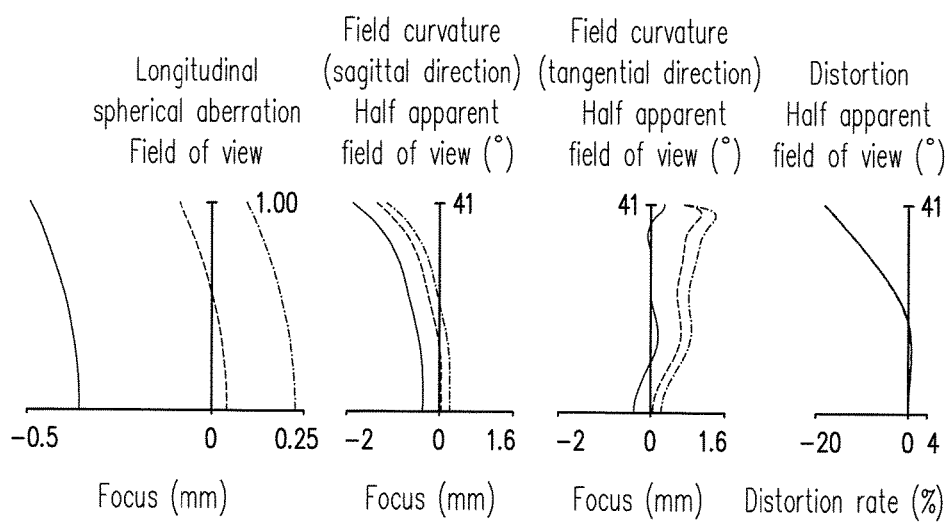
FIG. 48A to FIG. 48D illustrate a longitudinal spherical aberration and other aberrations of the ocular optical system according to the eleventh embodiment of the invention.

In FIG. 48A which illustrates the longitudinal spherical aberration when the pupil radius is 2.0000 mm according to the eleventh embodiment, the imaging point deviation of the off-axis ray at different heights is controlled within a range of ±0.5 mm. In FIG. 48B and FIG. 48C which illustrate two diagrams of field curvature aberrations, the focal length variation of the three representative wavelengths within the entire field of view falls within the range of ±1.9 mm. In FIG. 48D, the diagram of distortion aberration shows that the distortion aberration in the eleventh embodiment can be maintained within the range of ±18%. Accordingly, compared to the existing ocular optical system, the ocular optical system provided in the eleventh embodiment can have the favorable imaging quality, given that the system length SL is shortened to about 80.000 mm.

According to the above description, compared to the first embodiment, the advantage of the eleventh embodiment is as follows. The distortion of the eleventh embodiment is less than that of the first embodiment.

FIG. 51 and FIG. 52 are table diagrams showing the optical parameters provided in the foregoing eleven embodiments. If the relationship among the optical parameters in the ocular optical system 10 provided in the embodiments of the invention satisfies at least one of the following conditions, the design of the ocular optical system with favorable optical performance and the reduced length in whole becomes technical feasible:

1. If the system can satisfy the following condition, the aberrations of the first lens element 3 and the second lens element 4 can be corrected: T3/G23≤4.3. Preferably, 0.1≤T3/G23≤4.3 is satisfied. If the following condition can be satisfied, the aberrations of the first lens element 3, the second lens element 4, and the third lens element 5 may be slightly adjusted: G3D/T3≤3.51. Preferably, 0.16≤G3D/T3≤3.51 is satisfied.

2. Because 250 mm is the least distance of distinct vision of young people (the closest distance that the eye of young people is able to clearly focus on), the magnifying power of the system can approach a ratio of 250 mm and EFL. Therefore, if the following condition can be satisfied, the magnifying power of the system is unlikely to be so large that can increase the thickness and manufacturing difficulty of the lens element: 250 mm/EFL≤25. If the following condition can be further satisfied, EFL is unlikely to be so long that can affect the system length: 2.5≤250 mm/EFL≤25.

3. If the following condition can be satisfied, the observer is unlikely to experience the narrow vision: 40°≤ω. If the following condition can be further satisfied, a designing difficulty is not increased: 40° ω 60°.

4. If the system can satisfy at least one of the following conditions: 0.1≤G23/G3D≤10, 0.7≤AAG/T2≤25, 0.5≤T1/T2≤10, 2.2≤ALT/T2≤50, 0.7≤T1/T3≤10, and 0.4≤AAG/G3D≤20, the thickness and interval of each lens element can be maintained at an appropriate value, so as to prevent the slimness of the ocular optical system 10 in whole from being affected by any overly large parameter, or prevent the assembly from being affected or the manufacturing difficulty from increased by the any overly small parameter.

5. If the system can satisfy at least one of the following conditions: EFL/ALT≤1.8, EFL/AAG≤6.2, and 1.23≤TTL/EFL≤10 (more preferably, at least one of the following conditions is to be satisfied: 0.17≤EFL/ALT≤1.8 and 0.3≤EFL/AAG≤6.2), the EFL and various optical parameters can be maintained at an appropriate value, so as to prevent the aberration correction of the ocular optical system 10 in whole from being affected by any overly large parameter, or prevent the assembly from being affected or the manufacturing difficulty from increased by the any overly small parameter.

6. If the system can satisfy at least one of the following conditions: ER/T1≤8, 1≤ALT/ER≤10, ER/T3≤4.31, 3≤SL/ER≤29, (ER+G12+G3D)/T3≤8.01, ER/G23≤20, (ER+G12+G3D)/G23≤36 (more preferably, at least one of the following conditions is to be satisfied: 0.4≤ER/T1≤8, 0.2≤ER/T3≤4.31, 0.5≤(ER+G12+G3D)/T3≤8.01, 0.45≤ER/G23≤20, 0.3≤(ER+G12+G3D)/G23≤36), the exit pupil distance and the optical parameters of the lens elements can be maintained at an appropriate value, so as to prevent any parameter from being so large that can cause the distance between the eye and the ocular optical system 10 to be so large or small that can make the eye uncomfortable, or prevent the assembly from being affected or the manufacturing difficulty from increased by the any overly small parameter.

However, due to the unpredictability of the design of an optical system, with the framework set forth in the embodiments of the invention, the ocular optical system satisfying said conditions can be characterized by the reduced system length, the enlarged available aperture, the increased apparent field of view, the improved imaging quality, or the improved assembly yield, such that the shortcomings described in the related art can be better prevented.

To sum up, the ocular optical system 10 described in the embodiments of the invention may have at least one of the following advantages and/or achieve at least one of the following effects.

1. The longitudinal spherical aberrations; field curvature aberrations, and distortion aberrations provided in the embodiments of the invention all comply with usage specifications. Moreover, the off-axis rays with different heights and the three representative wavelengths (486 nm, 587 nm, and 656 nm) are all gathered around imaging points, and according to a deviation range of each curve, it can be observed that deviations of the imaging points of the off-axis rays with different heights are all controlled and thus capable of suppressing spherical aberrations, image aberrations, and distortion. With reference to the imaging quality data, distances among the three representative wavelengths (486 nm, 587 nm, and 656 nm) are fairly close, which indicates that rays with different wavelengths in the embodiments of the invention can be well concentrated under different circumstances to provide the capability of suppressing dispersion. As such, it can be known from the above that, the embodiments of the invention can provide favorable optical properties.

2. The display-side surface 42 of the second lens element 4 has a convex portion 421 in a vicinity of the optical axis I and a convex portion 423 in a vicinity of a periphery of the second lens element 4, the eye-side surface 41 of the second lens element 4 has a convex portion 411 in a vicinity of the optical axis I, and the eye-side surface 51 of the third lens element 5 has a concave portion 514 in a vicinity of a periphery of the third lens element 5, which are conducive to magnify the image.

3. In addition, system limitations may be further added by using any combination relation of the parameters selected from the provided embodiments to implement the system design with the same framework set forth in the embodiments of the invention. In view of the unpredictability of the design of an optical system, with the framework set forth in the embodiments of the invention, the ocular optical system satisfying said conditions can be characterized by the reduced system length, the enlarged exit pupil diameter, the improved imaging quality, or the improved assembly yield, such that the shortcomings described in the related art can be better prevented.

4. The aforementioned limitation relations are provided in an exemplary sense and can be randomly and selectively combined and applied to the embodiments of the invention in different manners; the invention should not be limited to the above examples. In implementation of the invention, apart from the above-described relations, it is also possible to add additional detailed structure such as more concave and convex curvatures arrangement of a specific lens element or a plurality of lens elements so as to enhance control of system property and/or resolution. For example, it is optional to form an additional convex portion in the vicinity of the optical axis on the eye-side surface of the first lens element. It should be noted that the above-described details can be optionally combined and applied to the other embodiments of the invention under the condition where they are not in conflict with one another.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An ocular optical system, for imaging of imaging rays entering an eye of an observer via the ocular optical system from a display screen, a side facing towards the eye being an eye-side, a side facing towards the display screen being a display-side, the ocular optical system comprising a first lens element, a second lens element, and a third lens element from the eye-side to the display-side in order along an optical axis, the first lens element, the second lens element, and the third lens element each comprising an eye-side surface and a display-side surface;

the first lens element having refracting power;
the display-side surface of the second lens element having a convex portion in a vicinity of the optical axis; and
the display-side surface of the third lens element having a concave portion in a vicinity of the optical axis, the third lens element having refracting power,
wherein lens elements of the ocular optical system having refracting power are only the first lens element, the second lens element, and the third lens element, and the ocular optical system satisfies:

$T3/G23 \leq 4.3$; and $G3D/T3 \leq 3.51$, where T3 is a thickness of the third lens element along the optical axis, G23 is an air gap from the second lens element to the third lens element along the optical axis, and G3D is a distance from the third lens element to the display screen along the optical axis.

2. The ocular optical system according to claim 1, wherein the ocular optical system further satisfies: $ER/T1 \leq 8$, where ER is a distance from a pupil of the eye of the observer to the first lens element along the optical axis, and T1 is a thickness of the first lens element along the optical axis.

3. The ocular optical system according to claim 1, wherein the ocular optical system further satisfies: $0.1 \leq G23/G3D \leq 10$.

4. The ocular optical system according to claim 1, wherein the ocular optical system further satisfies: $EFL/ALT \leq 1.8$, where EFL is an effective focal length of the ocular optical system, and ALT is a sum of thicknesses of the first lens element, the second lens element, and the third lens element along the optical axis.

5. The ocular optical system according to claim 1, wherein the ocular optical system further satisfies: $0.7 \leq AAG/T2 \leq 25$, where AGG is a sum of two air gaps from the first lens element to the third lens element along the optical axis, and T2 is a thickness of the second lens element along the optical axis.

6. The ocular optical system according to claim 1, wherein the ocular optical system further satisfies: $2.5 \leq 250$ mm/$EFL \leq 25$, where EFL is an effective focal length of the ocular optical system.

7. The ocular optical system according to claim 1, wherein the ocular optical system further satisfies: $1 \leq ALT/ER \leq 10$, where ALT is a sum of thicknesses of the first lens element, the second lens element, and the third lens element along the optical axis, and ER is a distance from a pupil of the eye of the observer to the first lens element along the optical axis.

8. An ocular optical system, for imaging of imaging rays entering an eye of an observer via the ocular optical system from a display screen, a side facing towards the eye being an eye-side, a side facing towards the display screen being a display-side, the ocular optical system comprising a first lens element, a second lens element, and a third lens element from the eye-side to the display-side in order along an optical axis, the first lens element, the second lens element, and the third lens element each comprising an eye-side surface and a display-side surface;

the first lens element having refracting power;
the display-side surface of the second lens element having a convex portion in a vicinity of a periphery of the second lens element; and
the display-side surface of the third lens element having a concave portion in a vicinity of the optical axis, the third lens element having refracting power,
wherein lens elements of the ocular optical system having refracting power are only the first lens element, the second lens element, and the third lens element, and the ocular optical system satisfies:

$T3/G23 \leq 4.3$; and $G3D/T3 \leq 3.51$, where T3 is a thickness of the third lens element along the optical axis, G23 is an air gap from the second lens element to the third lens element along the optical axis, and G3D is a distance from the third lens element to the display screen along the optical axis.

9. The ocular optical system according to claim 8, wherein the ocular optical system further satisfies: $ER/T3 \leq 4.31$, where ER is a distance from a pupil of the eye of the observer to the first lens element along the optical axis.

10. The ocular optical system according to claim 8, wherein the ocular optical system further satisfies: $0.5 \leq T1/T2 \leq 10$, where T1 is a thickness of the first lens element along the optical axis, and T2 is a thickness of the second lens element along the optical axis.

11. The ocular optical system according to claim 8, wherein the ocular optical system further satisfies: $EFL/AAG \leq 6.2$, where EFL is an effective focal length of the ocular optical system, and AGG is a sum of two air gaps from the first lens element to the third lens element along the optical axis.

12. The ocular optical system according to claim 8, wherein the ocular optical system further satisfies: $3 \leq SL/ER \leq 29$, where SL is a distance from a pupil of the eye of the observer to the display screen along the optical axis, and ER is a distance from a pupil of the eye of the observer to the first lens element along the optical axis.

13. The ocular optical system according to claim 8, wherein the ocular optical system further satisfies: (ER+G12+G3D)/T3≤8.01, where ER is a distance from a pupil of the eye of the observer to the first lens element along the optical axis, and G12 is an air gap from the first lens element to the second lens element along the optical axis.

14. The ocular optical system according to claim 8, wherein the ocular optical system further satisfies: 2.2≤ALT/T2≤50, where ALT is a sum of thicknesses of the first lens element, the second lens element, and the third lens element along the optical axis, and T2 is a thickness of the second lens element along the optical axis.

15. An ocular optical system, for imaging of imaging rays entering an eye of an observer via the ocular optical system from a display screen, a side facing towards the eye being an eye-side, a side facing towards the display screen being a display-side, the ocular optical system comprising a first lens element, a second lens element, and a third lens element from the eye-side to the display-side in order along an optical axis, the first lens element, the second lens element, and the third lens element each comprising an eye-side surface and a display-side surface;
the first lens element having refracting power;
the eye-side surface of the second lens element having a convex portion in a vicinity of the optical axis; and
the display-side surface of the third lens element having a concave portion in a vicinity of the optical axis, the eye-side surface of the third lens element having a concave portion in a vicinity of a periphery of the third lens element,
wherein lens elements of the ocular optical system having refracting power are only the first lens element, the second lens element, and the third lens element, and the ocular optical system satisfies:

$T3/G23 \leq 4.3$; and $G3D/T3 \leq 3.51$ where T3 is a thickness of the third lens element along the optical axis, G23 is an air gap from the second lens element to the third lens element along the optical axis, and G3D is a distance from the third lens element to the display screen along the optical axis.

16. The ocular optical system according to claim 15, wherein the ocular optical system further satisfies: ER/G23≤20, where ER is a distance from a pupil of the eye of the observer to the first lens element along the optical axis.

17. The ocular optical system according to claim 15, wherein the ocular optical system further satisfies: 0.7≤T1/T3≤10, where T1 is a thickness of the first lens element along the optical axis.

18. The ocular optical system according to claim 15, wherein the ocular optical system further satisfies: 1.23≤TTL/EFL≤10, where TTL is a distance from the eye-side surface of the first lens element to the display screen along the optical axis, and EFL is an effective focal length of the ocular optical system.

19. The ocular optical system according to claim 15, wherein the ocular optical system further satisfies: 0.4≤AAG/G3D≤0.20, where AGG is a sum of two air gaps from the first lens element to the third lens element along the optical axis.

20. The ocular optical system according to claim 15, wherein the ocular optical system further satisfies: (ER+G12+G3D)/G23≤36, where ER is a distance from a pupil of the eye of the observer to the first lens element along the optical axis, and G12 is an air gap from the first lens element to the second lens element along the optical axis.

* * * * *